US00RE42688E

(19) United States
(12) Reissued Patent
Stegall

(10) Patent Number: US RE42,688 E
(45) Date of Reissued Patent: Sep. 13, 2011

(54) VEHICLE WASTEWATER DRAINAGE SYSTEM

(75) Inventor: Lannie Stegall, Lexington, KY (US)

(73) Assignee: Thetford Corporation, Ann Arbor, MI (US)

(21) Appl. No.: 10/794,594

(22) Filed: Mar. 5, 2004

Related U.S. Patent Documents

Reissue of:
(64) Patent No.: 6,352,088
Issued: Mar. 5, 2002
Appl. No.: 09/691,002
Filed: Oct. 18, 2000

(51) Int. Cl.
*B65B 1/04* (2006.01)

(52) U.S. Cl. ..... 141/1; 141/65; 4/323; 137/899

(58) Field of Classification Search ..... 141/35, 141/98, 1; 4/321–323; 134/166 C; 137/899, 137/565.37
See application file for complete search history.

(56) References Cited

U.S. PATENT DOCUMENTS

| | | | | |
|---|---|---|---|---|
| 2,743,960 | A * | 5/1956 | Kamin | 239/266 |
| 3,594,825 | A | 7/1971 | Reid | |
| 3,891,554 | A | 6/1975 | Cooper et al. | |
| 3,963,040 | A * | 6/1976 | Gezari | 137/899.2 |
| 4,040,956 | A * | 8/1977 | Selwitz | 210/764 |
| 4,133,347 | A | 1/1979 | Mercer | |
| 4,214,324 | A | 7/1980 | Kemper et al. | |
| 4,223,702 | A | 9/1980 | Cook | |
| 4,550,452 | A | 11/1985 | Tufts | |
| 4,744,385 | A | 5/1988 | Houghton | |
| 4,779,650 | A | 10/1988 | Sargent et al. | |
| 5,023,959 | A | 6/1991 | Mercer | |
| 5,056,544 | A | 10/1991 | Stevens | |
| 5,141,017 | A * | 8/1992 | Trottier | 137/240 |
| 5,206,962 | A * | 5/1993 | Thorwaldson | 4/323 |
| 5,247,974 | A | 9/1993 | Sargent et al. | |
| 5,382,138 | A * | 1/1995 | Chilton | 417/234 |
| 5,560,821 | A | 10/1996 | Leo et al. | |
| 5,588,459 | A | 12/1996 | Ellis | |
| 5,743,474 | A | 4/1998 | Stevenson | |
| 5,830,366 | A | 11/1998 | Husick | |
| 5,928,514 | A | 7/1999 | Gothreaux | |
| 5,937,888 | A * | 8/1999 | McKiernan et al. | 137/205 |
| 6,006,766 | A | 12/1999 | Soulages | |
| 6,029,707 | A | 2/2000 | Couch | |
| 6,318,383 | B1 * | 11/2001 | Wood | 134/22.1 |

OTHER PUBLICATIONS

"Thetford telescoping drain Owners Manual," by Thetford Corporation, Oct. 1, 1989, pages: cover page; unnumbered page; and page numbered "Form#17107".

(Continued)

*Primary Examiner* — Steven O Douglas
(74) *Attorney, Agent, or Firm* — Harness, Dickey & Pierce, P.L.C.

(57) ABSTRACT

A wastewater drainage system for a vehicle, such as a recreational vehicle (RV), is provided. The system includes a pump, such as a macerator pump, in selective fluid communication with the black water tank and the gray water tank, and a drainage hose connected to the exit end of the pump for directing wastewater to a wastewater storage area. The system allows the RV user to clean the black water tank using water from the gray water tank, and allows gray water to be stored in the black water tank so that less time is spent draining the tanks and more time is spent enjoying the RV experience.

19 Claims, 20 Drawing Sheets

OTHER PUBLICATIONS

"Thetford telescoping drain Installation Guide," by Thetford Corporation, Oct. 1, 1989, pages: cover page; pp. 1 to 6; and page numbered "Form#17108".
Advertising brochure for Thetford Telescoping Drain, by Thetford Corporation, Jan. 1990, pages: page numbered "Form No. 17158"; and unnumbered page.
Northwest Trailer Parts, Inc. Catalog, by Northwest Trailer Parts, Inc., Fourteenth Edition, 1994, pages: cover page; copy of spine; title page; introductory page titled "What a customer of Northwest Trailer Parts, Inc. can expect . . . "; catalog users guide page; quick reference section index page; breakdowns index page; section 10, titled "Fresh Water Supplies," pp. 10-1 to 10-23; and section 11, titled "Waste Water Supplies—Hoses," pp. 11-1 to 11-15.
Camping World Advertising Mailer, by Camping World, Apr. 1996, pages: cover page; p. 8, and p. 10.
Camping World Advertising Mailer, by Camping World, Jun. 1996, pages: cover page; p. 20; and p. 21.
Complaint for infringement of U.S. Pat. No. 6,352,088, filed Aug. 17, 2009 in the Eastern District of Michigan, Case No. 2:09-cv-13235-GCS-MJH.
ITT Corporation Brochure regarding PAR® Self-Priming Macerator Pump Units dated 1986 (4 pages).
Complaint filed Feb. 12, 2010 in the Western District of Washington, Case No. 3:30-cv-5106-RBL.
Northwest Trailer Parts, Inc. Catalog, by Northwest Trailer Parts, Inc., 1997-98, pages: cover page; copy of spine; section 11, titled "Waste Water Supplies—Hoses," pp. 11-1 to 11-16.
"Uniform Plumbing Code," International Association of Plumbing and Mechanical Officials, 1985 Edition, title page and p. 176.
"The Sewer Solution System," printed pages from www.sewersolution.com, dated Sep. 14, 2009.
"Valterra EZ Coupler Rotating Fittings Bayonet Sewer System," pages numbered 11-15 and 17, produced in litigation on Jul. 6, 2010.
"Camco Sewer Hose Fittings & Connectors," printed pages from www.camco.net, dated Sep. 14, 2009.
"Camco Sewer Hoses," printed page from www.camco.net, dated Sep. 14, 2009.
"Prest-o-Fit," printed pages from www.prestofit.com, dated Sep. 14, 2009.
"Prest-o-Fit Universal Elbow," printed page from www.prestofit.com, dated Sep. 14, 2009.
Walex Products Company, Inc., pages numbered 24 and 25, produced in litigation on Jul. 6, 2010.
Motion to Stay Proceedings Pending Reissue of U.S. Pat. No. 6,352,088, including Exhibits A and B, filed Jun. 4, 2010 in the Western District of Washington, Case No. 3:10-cv-05106-RBL.
Corrected Stipulation and Order of Dismissal, filed Feb. 18, 2011 in the Western District of Washington, Case No. 3:10-cv-05106-RBL.

* cited by examiner

VEHICLE WASTEWATER DRAINAGE SYSTEM

Matter enclosed in heavy brackets [ ] appears in the original patent but forms no part of this reissue specification; matter printed in italics indicates the additions made by reissue.

FIELD OF THE INVENTION

The present invention relates to a system and method for disposing of wastewater from a vehicle, and more particularly, to a system and method for disposing of wastewater from black and gray water holding tanks of a vehicle such that the black water tank and discharge lines are cleaned thoroughly without using fresh water or an excessive amount of gray water.

BACKGROUND OF THE INVENTION

Recreational vehicles, which includes a variety of motor homes, travel trailers, and campers, are widely used and provide short-term or long-term living quarters. In this regard, a conventional recreational vehicle (RV) typically includes indoor plumbing, which includes a sink, a bathtub or shower, and/or a toilet. Larger RVs typically include multiple sinks, showers, and toilets, and can produce several gallons of wastewater per day, which is typically stored on board and disposed of at regular intervals.

The wastewater in an RV is commonly referred to as either gray water or black water. The gray water is the discharge from the kitchen sink, dish washing water, and water from the bathroom sink and shower. The black water is the water and waste from the toilet. The black water and gray water are stored separately in a black water tank and a gray water tank, respectively, but can be discharged from a common discharge pipe connecting the tanks.

More specifically, the black water tank and gray water tank are connected by a "Y" connection having a common discharge end. Each tank includes a valve leading to the Y connection so that the tanks can be drained individually. Conventional drainage systems include a single flexible drainage hose that is temporarily connected to the end of the discharge pipe by the RV user for draining the wastewater to a sewer or other storage device. Conventional systems rely on gravity, such that if either tank is opened, the volume in the tank empties out the gravity fed system to the sewer. In an attempt to keep the flexible hose clean, the black water tank is typically drained first followed by the gray water tank. This method appears simple, but it is filthy and unhealthy. For example, the flexible drainage hose can slip off the underground sewage line causing wastewater to spill out on the ground. Even worse, the drainage hose can slip off the drainage pipe and spill raw sewage into a compartment in the RV or on the RV user. If the RV user avoids either of these scenarios, however, the end of a conventional hose remains open, such that after the draining process remnants of the wastewater can drip out of the end of the hose and come in contact with the RV or RV user.

In addition, the RV user must endure the rather unsanitary process of removing and rinsing the drainage hose, such as by using a fresh water hose, and then placing the drainage hose back into the storage compartment where it is kept for future use. This is often avoided by the RV user for obvious sanitary reasons. Under the gravity fed conventional system, the total time required to empty the tanks and rinse the hose and tanks from inside the RV is approximately 25-35 minutes. This process must be repeated two to three times weekly for an average use.

A well-known problem in the RV industry is the clogging of the black water tank and the discharge pipe leading from the black water tank due to solids and other matter becoming clogged in the tank, which results in periodic replacement of the black water tank or extremely unsanitary maintenance and repair of the tank. A major contributor to this problem is in the flushing of the RV toilet, which is different than the flushing of a conventional toilet in that only a small fraction of water is used to flush the toilet compared to a conventional toilet. This is done to conserve fresh water and to limit the volume taken in the black water tank. Because of this, the black water tank has a higher concentration of solid matter, which often leads to clogging the black water tank when emptying the tank. The only way to introduce water to the black water tank is to flush the commode manually as described above, or attach a water hose to a black water tank intake port, which may be either provided by the manufacturer or installed by the RV user. Obviously this requires fresh water, either from the RV fresh water tank or an outside source, which is very wasteful and time consuming.

In addition, it is also known that detergents and surfactants can help break up clogs in the black water tanks. A conventional method to obtain the benefits of detergents and surfactants is to wash dishes in a bucket in the kitchen, and then dump the bucket into the commode to furnish a rinse having detergents and surfactants, which also conserves space in the gray water tank. Due to the tedious steps of hooking up a fresh water hose or taking the time to stand on the flush valve of the commode in order to introduce water to the black water tank, most RV users don't take time to rinse the black water tank. Thus, the black water tank will settle with solids and cause blockage in the discharge pipe. Accordingly, the black water tank and/or discharge pipe will have to be replaced or repaired, often at great expense.

Another problem with conventional RV disposal systems is the frequency at which the storage tanks must be discharged. Typically, the gray water tank and the black water tank hold the same volume, such as 45 gallons each. The amount of gray water produced is much greater than the black water in common usage. For example, two people typically produce 15 gallons of gray water daily, while black water production is only about 3 gallons per day. Accordingly, a large portion of the space in the black water tank goes unused since there is not currently a crossover to the two tanks due to plumbing codes and the design of conventional plumbing systems. Thus, it is desirable to provide a wastewater disposal system that quickly empties the tanks in a sanitary fashion without using fresh water or requiring inconvenient operations by the RV user. It is also desirable to increase the time between emptying the tanks so the RV user can have a more enjoyable RV experience.

SUMMARY OF THE INVENTION

The present invention is directed to a wastewater disposal system for a vehicle, such as a recreational vehicle, that provides a simple, inexpensive method for flushing the gray water and black water tanks in the vehicle. For sanitation and efficiency purposes, the system according to one embodiment of the present invention is permanently attached to the wastewater discharge pipe of a recreational vehicle and provides a pump, such as a macerator pump, for grinding the waste into small pieces before directing the waste out a drainage tube leading to the sewer. Advantageously, the system and method of the present invention allows the gray water from the gray water tank to be directed into the black water tank so that the black water tank and discharge lines can be thoroughly cleaned using the gray water instead of using fresh water. Furthermore, the system and method of the present invention provide a sanitary and efficient way to store wastewater in the recreational vehicle so that the storage capacity is up to twice that of conventional systems.

BRIEF DESCRIPTION OF THE DRAWINGS

Figure 1:
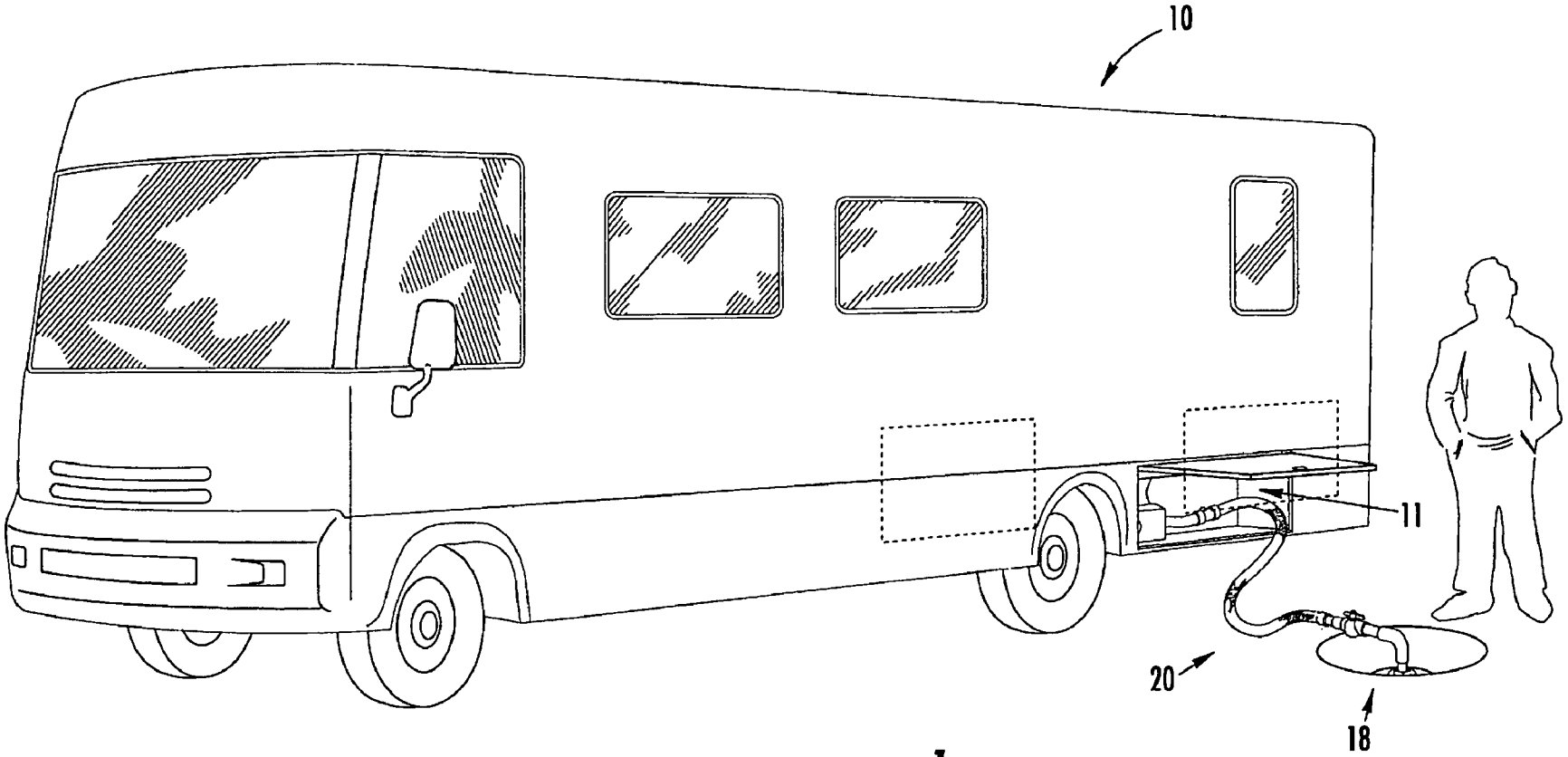
Figure 2:
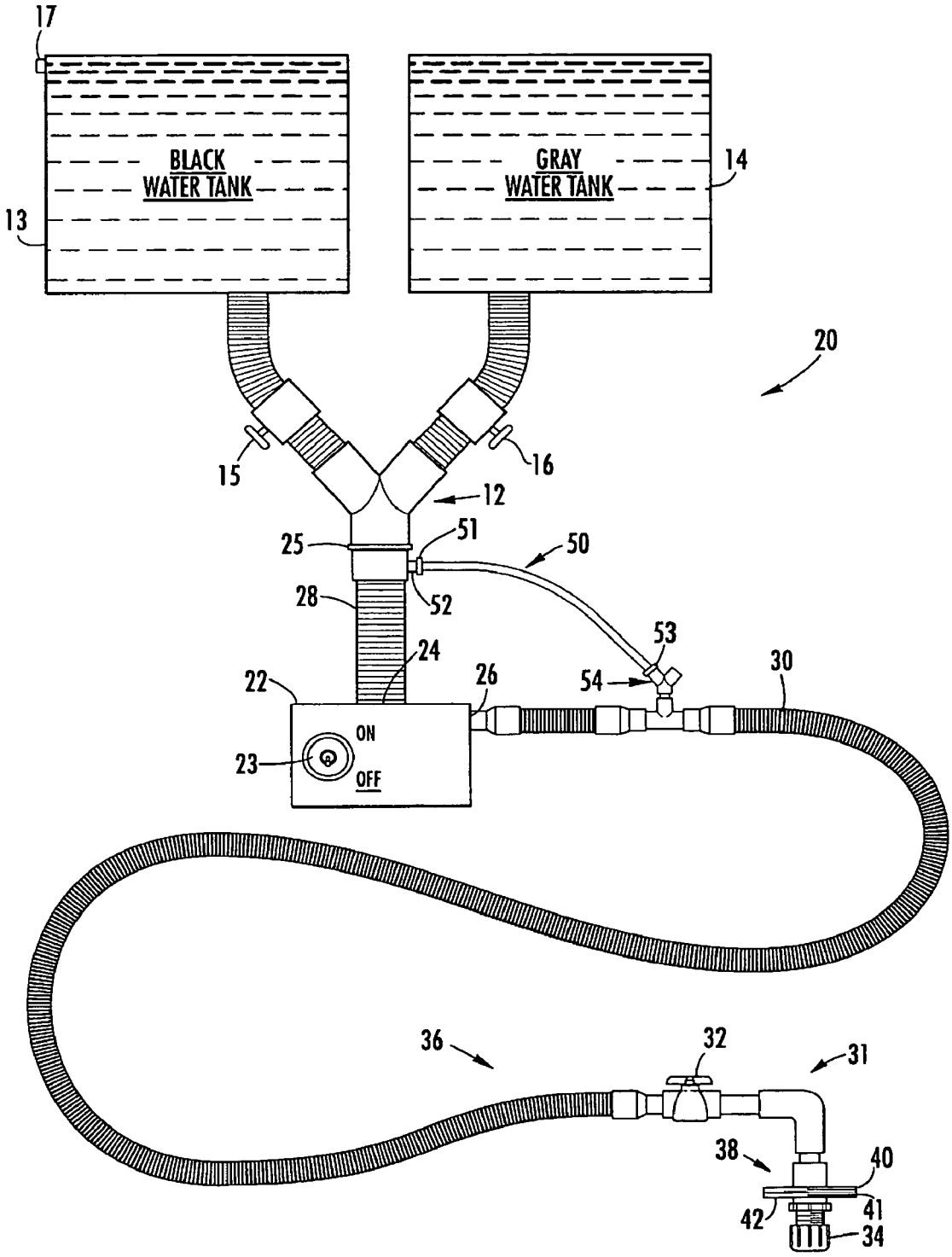
Figure 3A:
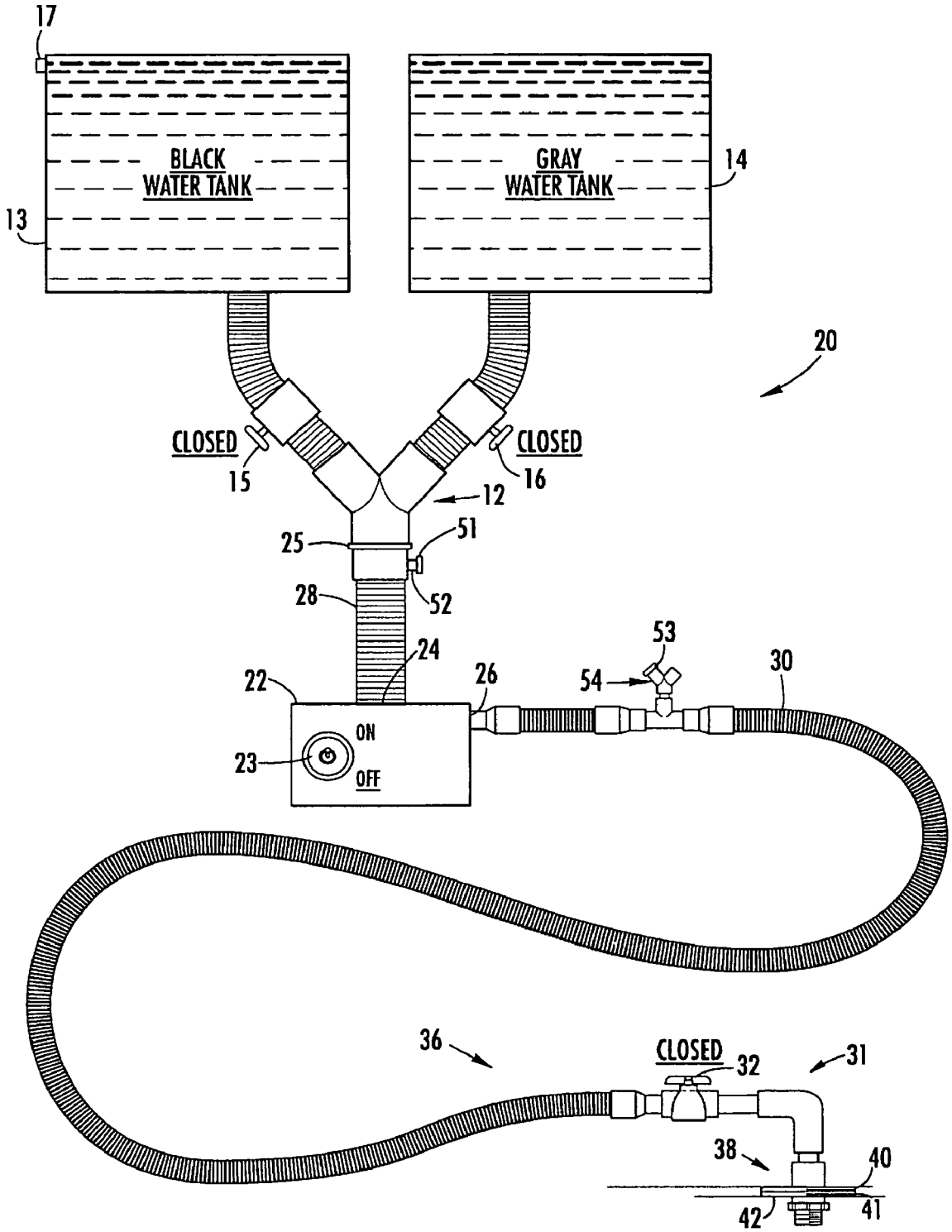
Figure 3B:
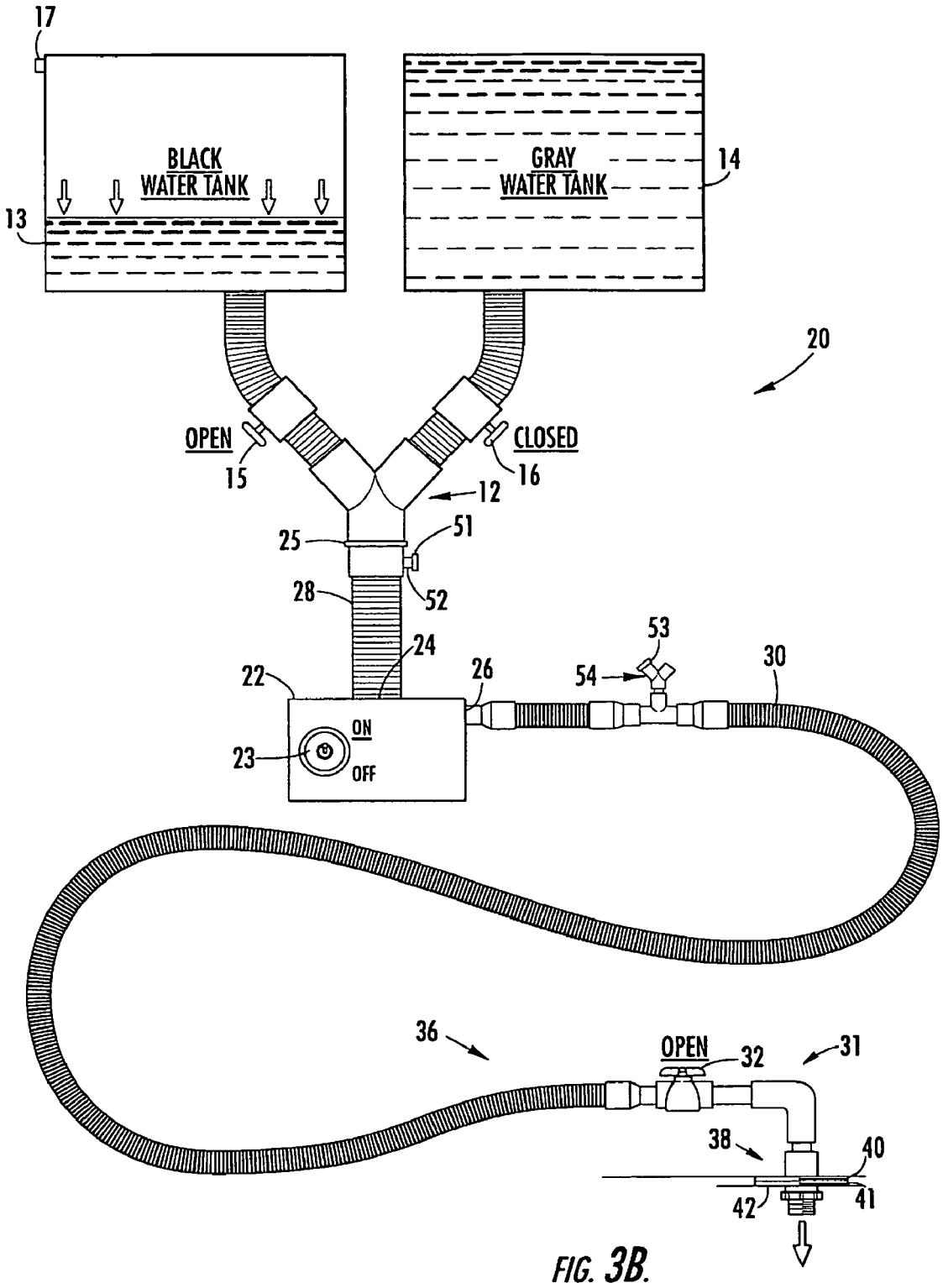
Figure 3C:
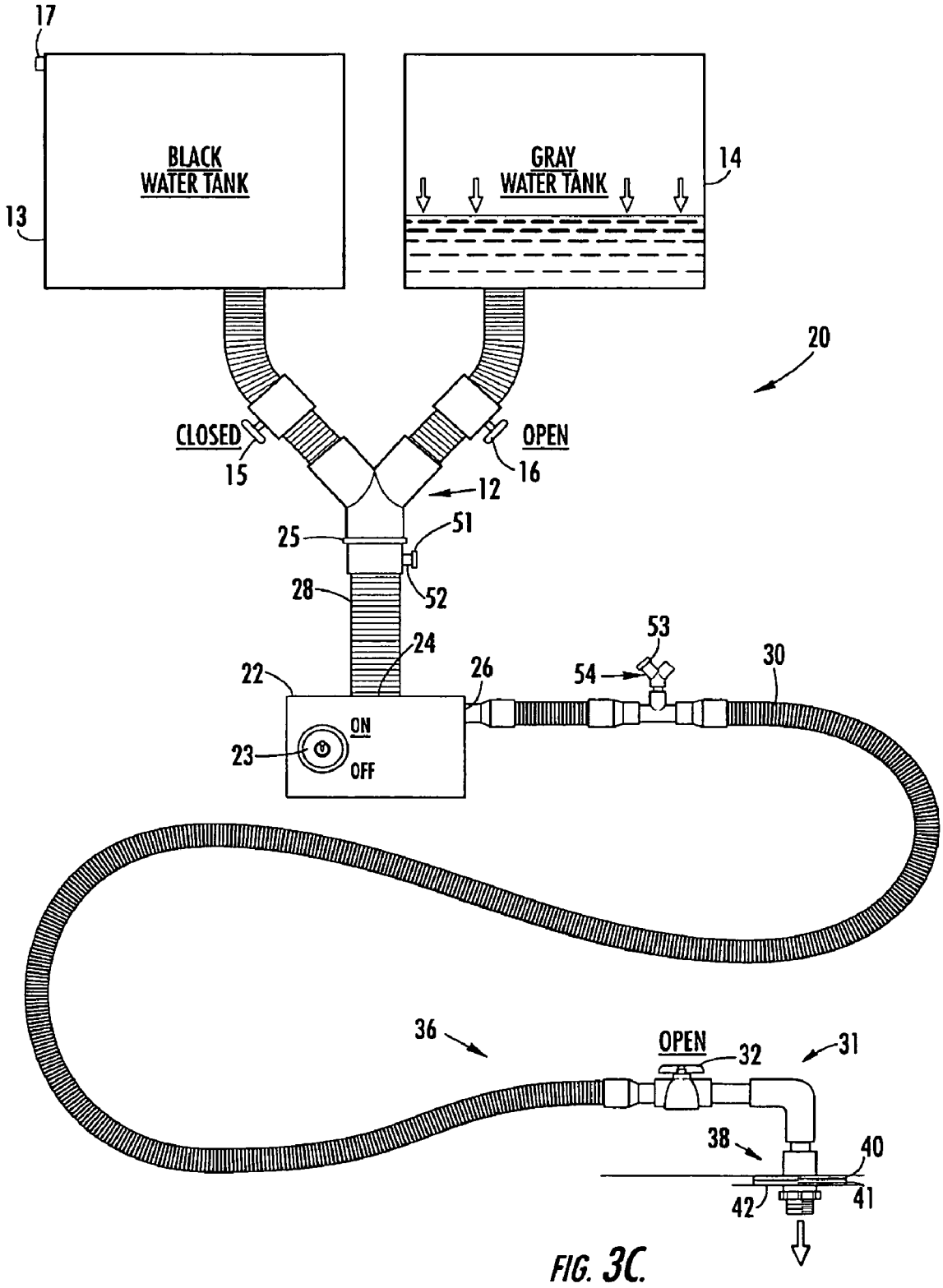

Having thus described the invention in general terms, reference will now be made to the accompanying drawings, which are not necessarily drawn to scale, and wherein:

FIG. 1 is a simplified schematic diagram illustrating a recreational vehicle embodying a wastewater disposal system in accordance with the present invention;

FIG. 2 is a more detailed schematic view of a wastewater disposal system in accordance with the present invention;

FIGS. 3A-3C illustrate the steps of a method of disposing of wastewater according to one embodiment of the present invention;

FIGS. 4A-4D illustrate the steps of a method of rinsing the black water tank and disposing of wastewater according to one embodiment of the present invention;

FIGS. 5A-5E illustrate the steps of a method of rinsing the black water tank and disposing of wastewater according to another embodiment of the present invention; and FIGS. 6A-6F illustrate the steps of a method of storing wastewater in a vehicle according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Turning to the accompanying drawings, FIGS. 1 and 2 show a wastewater disposal system 20 for a vehicle, such as a recreational vehicle (RV), generally referred to as 10. Although the system 20 is described in relation to an RV, the system can be used on other vehicles having onboard toilets, such as buses. The RV includes a storage area 11 having a discharge pipe 12 extending therein from a black water tank 13 and a gray water tank 14. The tanks 13, 14 are in selective fluid communication with the discharge pipe 12 via a set of valves 15 and 16, respectively. Accordingly, the black water tank 13 can be "opened" or "closed" by operating the black water tank valve 15 either manually or automatically. Likewise, the gray water tank 14 can be opened or closed by operating the gray water tank valve 16. The discharge pipe 12 is typically "Y" shaped and has an industry standard diameter of 3 inches, although other sizes may also be used. The black water tank 13 can be provided with an inlet connection 17 that is either equipped by the manufacturer or is retrofitted by the RV owner/user.

The wastewater disposal system 20 of the present invention includes a pump 22, such as a self-priming macerator pump, having an inlet 24 and an outlet 26. In one embodiment, the pump 22 is electrically connected to a standard 12 volt system present in RVs, and a circuit breaker (not shown) is provided for safety reasons. A power switch 23 is connected to the pump 22 for turning the pump on and off. In one embodiment, the power switch 23 is located proximate the pump 22, although the power switch can be located in a remote location for convenience. An inlet hose 28 is connected to the inlet 24 of the pump 22 and is adapted for connecting to the discharge pipe 12. Advantageously, the inlet hose 28 can be permanently attached to the discharge pipe 12 at coupling 25 and does not need to be removed and periodically cleaned by the RV user as in conventional systems, as discussed more fully below.

The disposal system 20 also includes a flexible drainage hose 30 connected to the outlet 26 of the pump 22. The drainage hose 30, which has a significantly smaller diameter compared to the inlet hose 28, such as about ¾"-1", directs a flow of wastewater from the pump 22 to a wastewater storage area, such as a waste tank receiver, sewer connection, or dump station 18. The drainage hose 30 preferably has a diameter substantially equal to the outlet 26 of the pump 22 in order to prevent excessive pressure through the hose during the discharge process. In one embodiment, the drainage hose 30 includes a discharge device 31 at the exit end 36 of the hose, which includes a valve 32, such as a ball valve, for selectively allowing the wastewater to flow through the drainage hose. Advantageously, the valve 32 is located near the exit end 36 of the hose 30 so that the valve can be opened and closed while the hose is directly or indirectly attached to the dump station 18. In addition, the discharge device 31 can include a removable drip cap 34 attached to the exit end 36 thereof so that wastewater does not inadvertently emit from the exit end and spill out onto the ground, the storage area 11, or the RV user.

The discharge device 31 can also include a dump station adapter 38 which is capable of securing the exit end 36 of the drainage hose 30 in the dump station 18 so that the exit end does not become inadvertently dislodged from the dump station, particularly during the discharge process. In particular, the dump station adapter 38 includes a body portion 40 having external threads 41 and a distal surface 42 for securing the adapter 38 and exit end 36 of the drainage hose 30 to the dump station 18, which typically has a set of threads corresponding to the threads 41 of the adapter. Thus, the adapter 38 can be threaded into the dump station 18 so that the exit end 36 of the drainage hose 30 is prevented from inadvertently dislodging from the dump station. When properly secured to the dump station 18, the adapter 38 substantially prevents fumes and odors from escaping to the atmosphere.

Advantageously, the adapter 38 is rotatable about a central axis, which allows the adapter to be threadably inserted into the dump station while keeping the drainage hose and remainder of the discharge device 31 stationary. This feature also allows the discharge device 31 to rotate about the central axis during the discharge process. Although in conventional systems rotation of the drainage hose in the dump station during the discharge process can cause the hose to dislodge from the dump station and likely spill wastewater, the rotating feature of the discharge device 31 according to the present invention allows the drainage hose 30 to remain connected to the dump station 18 despite movement of the drainage hose during the discharge process. Alternatively, the dump station adapter 38 could have a non-threaded design such that the adapter can be press fit or otherwise secured to the dump station 18. In yet another embodiment, the dump station adapter 38 includes the threads 41 described above in combination with a flexible grommet, such as a rubber grommet having a frustoconical shape, that is removably disposed about the adapter for press fitting the adapter in dump stations having openings greater than or less than the diameter of the adapter, yet being removed when the adapter can be threaded into a dump station having an opening corresponding to the diameter of the adapter. In all embodiments, however, the drainage hose 30 is permitted to rotate about the central axis during the discharge process so that the hose is not inadvertently dislodged from the dump station.

The disposal system 20 can also include a bypass hose 50 that is connected between the inlet hose 28 and an intermediate location along the drainage hose 30. In particular, the bypass hose 50 includes a first bypass hose adapter 52 and a second bypass hose adapter 54 having ball valves 51 and 53, respectively, such that wastewater can be selectively directed around the pump 22 and out the drainage hose 30, as discussed more fully below. In addition, it is not necessary to close the ball valve 51 prior to opening the black water tank 13 when the pump 22 is running even though the ball valve and first bypass hose adapter 52 are located just below the black water tank valve 15. Advantageously, any solids that might enter the first bypass hose adapter 52 and ball valve 51 and block flow in the bypass hose 50 are drawn to the inlet 24 of the pump 22 when the pump is in operation, since the pump inlet 24 provides a low pressure region compared to the outlet 26 of the pump and second bypass hose adapter 54.

In one embodiment (see FIGS. 4A-4D), the disposal system 20 can also include a flush hose 60 connected to the black water tank 13 and an intermediate location along the drainage hose 30. In particular, the flush hose 60 is connected to a flush hose adapter 62 having a ball valve 63 at one end and connected to the black water tank 13 at the other end for selectively directing a flow of wastewater exiting the pump 22 to the black water tank. Thus, wastewater exiting the pump 22 can be "recycled" for use as a flushing fluid inside the black water tank 13.

Associated methods are also provided by the present invention. As shown in FIG. 3, the system 20 is used by positioning the discharge device 31 of the hose 30 in fluid communication with the dump station 18, such as by securing the discharge device 31 to the dump station via the dump station adapter 38. The drip cap 34 must be removed before positioning the discharge device 31 in fluid communication with the dump station 18, and this is preferably done just before the positioning step. The valve 32 of the discharge device 31 is then opened and, according to one embodiment, the black water tank valve 15 is opened allowing black water to flow from the black water tank 13 through the discharge pipe 12 to the inlet 24 of the pump 22 (FIGS. 3A-3B). Advantageously, the pump 22 prevents wastewater from travelling through the pump when the pump is off. The pump 22 is then engaged by the power switch 23, which causes wastewater from the black water tank 13 to be directed through the pump. Preferably, the pump is a macerator pump so that any solid matter passing therethrough is ground up. The wastewater is then forced out the exit end 36 of the drainage hose 30 via the discharge device 31.

Once the black water tank 13 is drained, the gray water tank 14 can be drained in the same manner, including opening the gray water tank valve 16 so that gray water is directed through the pump 22 and out the drainage hose 30 (FIG. 3C). This process cleans the inlet hose 28, pump 22, and drainage hose 30. When the discharge process is complete, the valve 32 of the discharge device 31 is closed such that any leftover liquids in the discharge hose 30 are prevented from escaping. As an even further precaution against contact between the wastewater and the RV user, the drip cap 34 can be reinstalled on the discharge device. Although these steps can be performed manually, the present invention can also include a controller (not shown) for providing a substantially automated process, such as automated processes used for dishwashers and washing machines, wherein the valves and pump are automatically switched on and off in sequence for drainage.

Figure 4A:
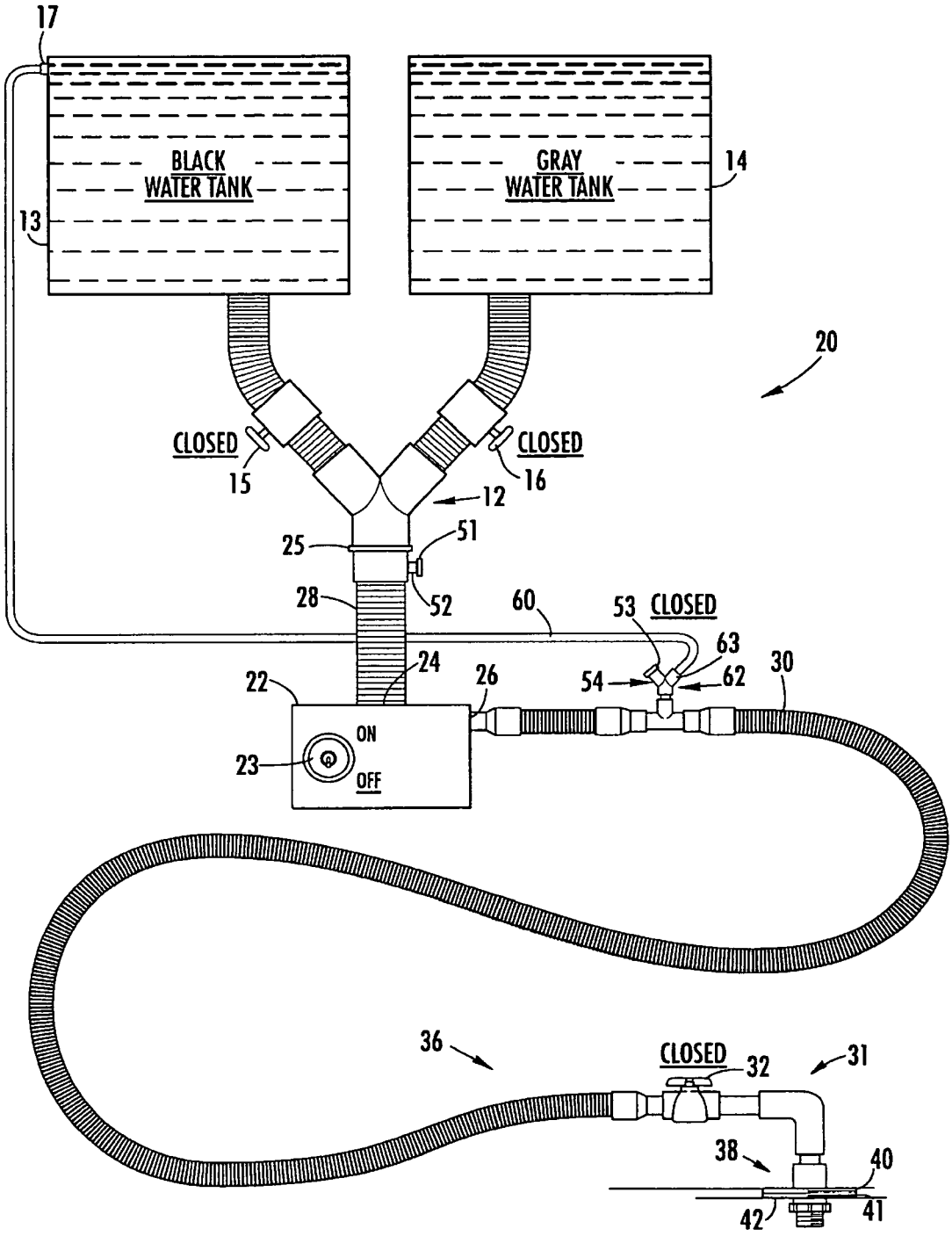
Figure 4B:
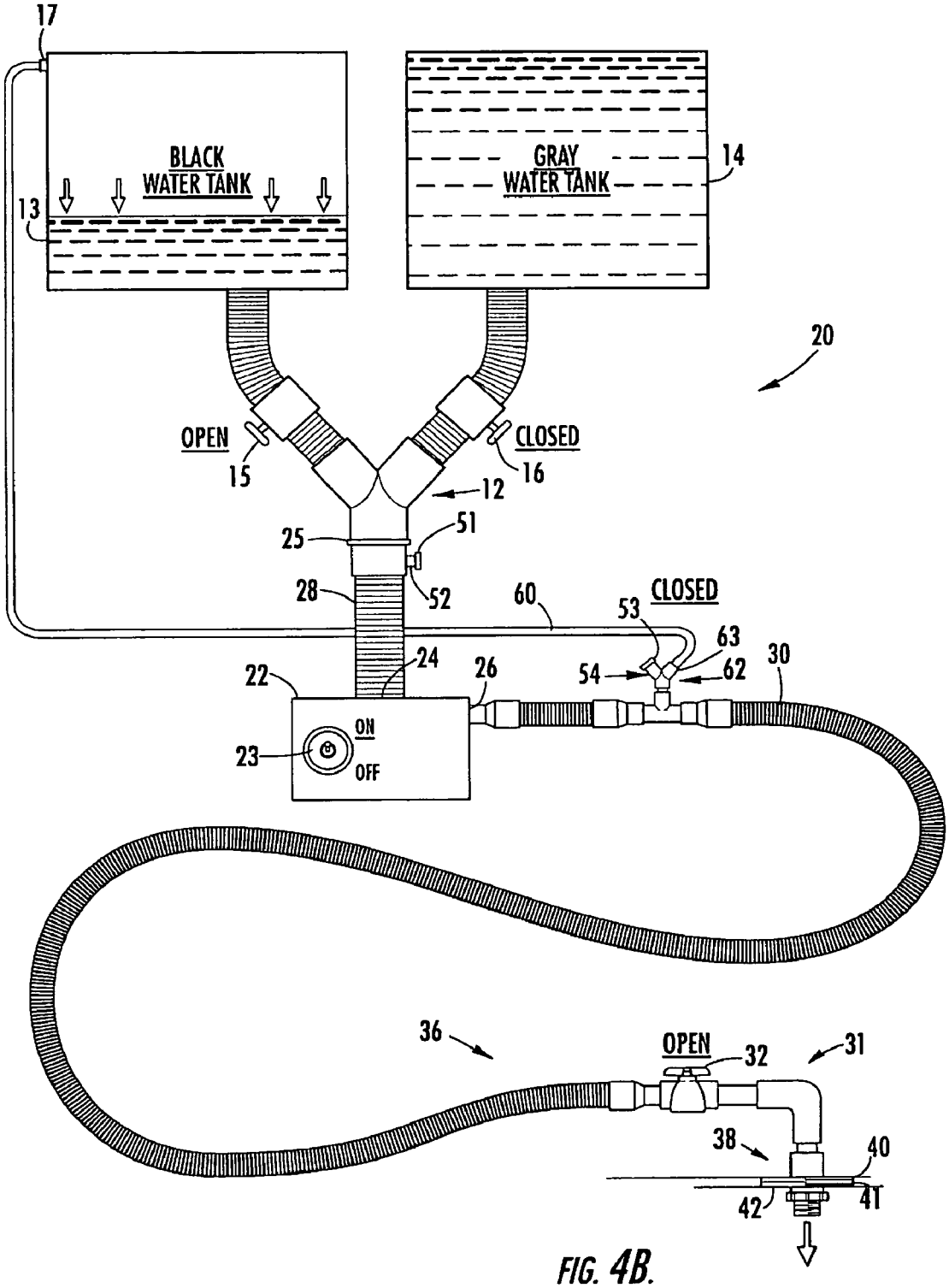
Figure 4C:
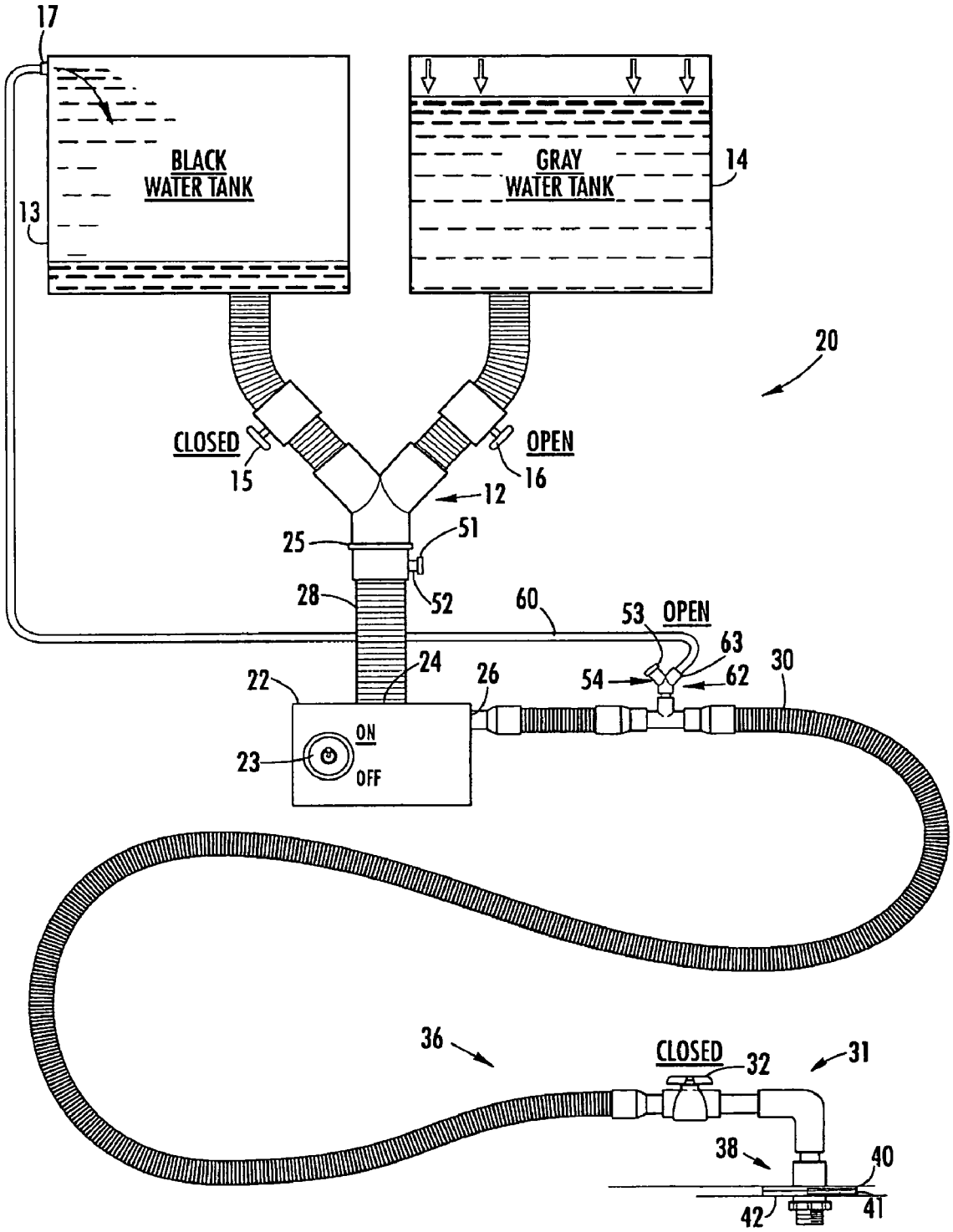
Figure 4D:
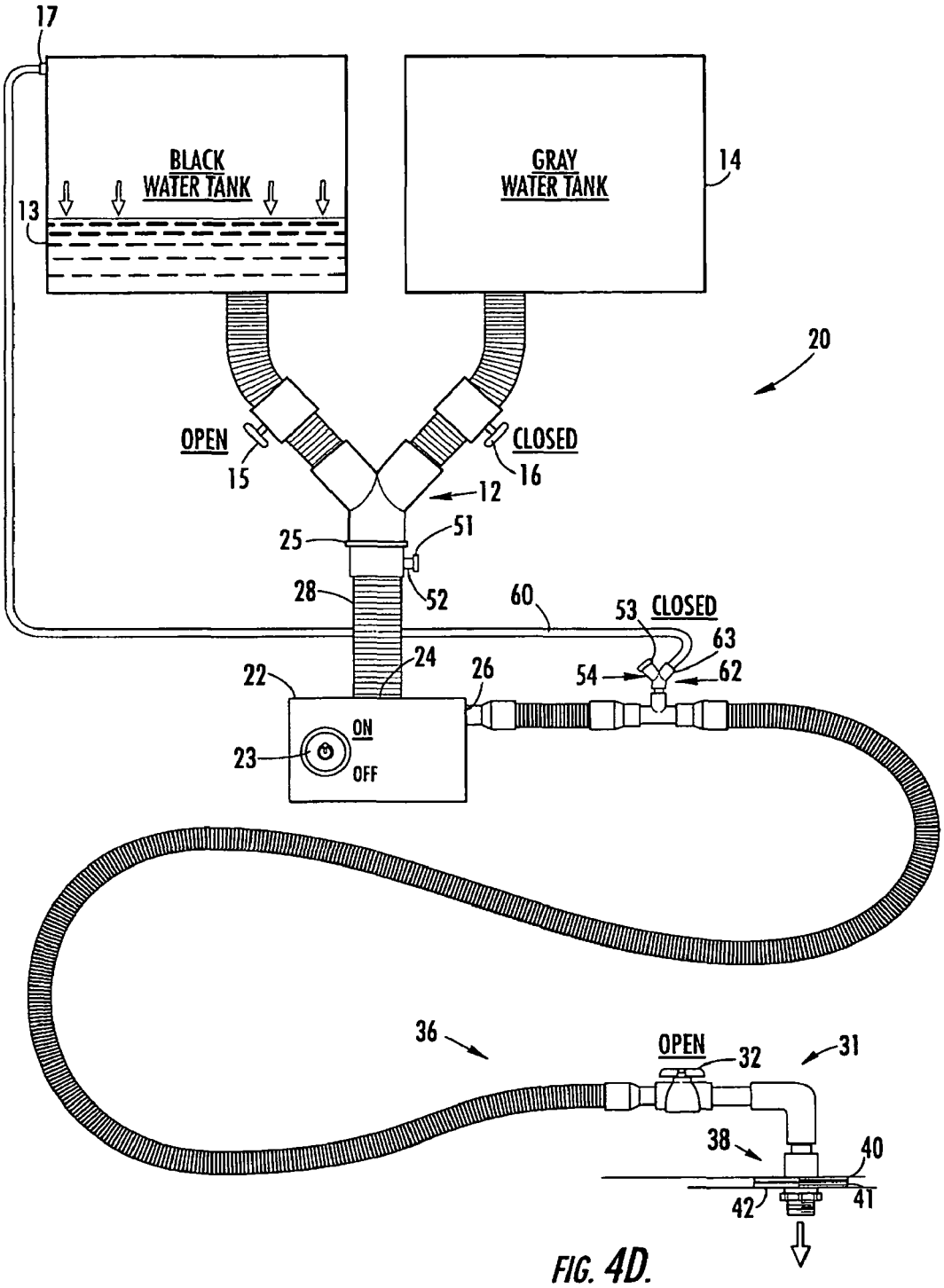

FIGS. 4A-4D illustrate another method of the present invention, wherein the disposal system 20 is used by attaching the discharge device 31 to the dump station 18 and draining the black water tank 13 as described above, but then turning the pump 22 off and closing the valve 32 of the discharge device such that wastewater cannot escape the exit end 36 (FIGS. 4A-4C). After opening the valve 16 to the gray water tank 14 and the valve 63 at the flush hose adapter 62, the pump 22 is turned on so that wastewater is directed through the pump and the flush hose 60 into the black water tank (See FIG. 4C). Thus, the wastewater directed through the flush hose 60 helps to flush the black water tank 13 and prevents the need to periodically flush the black water tank using fresh water. In addition, any surfactants and detergents present in the gray water tank 14 are introduced into the black water tank 13, which helps to cleanse the black water tank. The black water tank valve 15 can be open or closed during this process, and preferably is closed. If the black water tank valve 15 is closed, the black water tank can then be drained by turning off pump 22, closing the valve 16 to the gray water tank 14 and the valve 63 at the flush hose adapter 62, opening the valve 32 of the discharge device 31, opening the valve 15 of the black water tank 13, and turning the pump on (FIG. 4D).

Figure 5A:
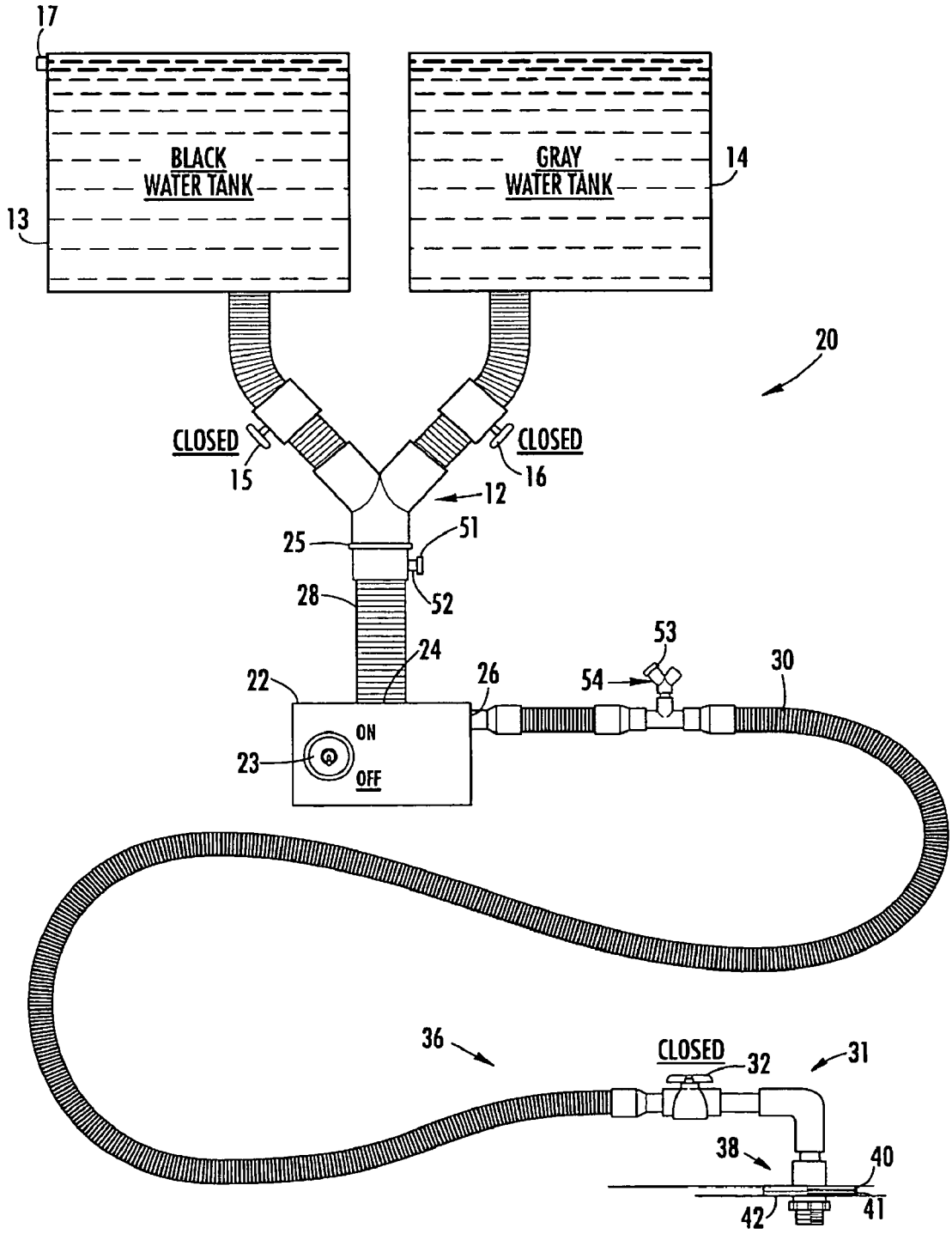
Figure 5B:
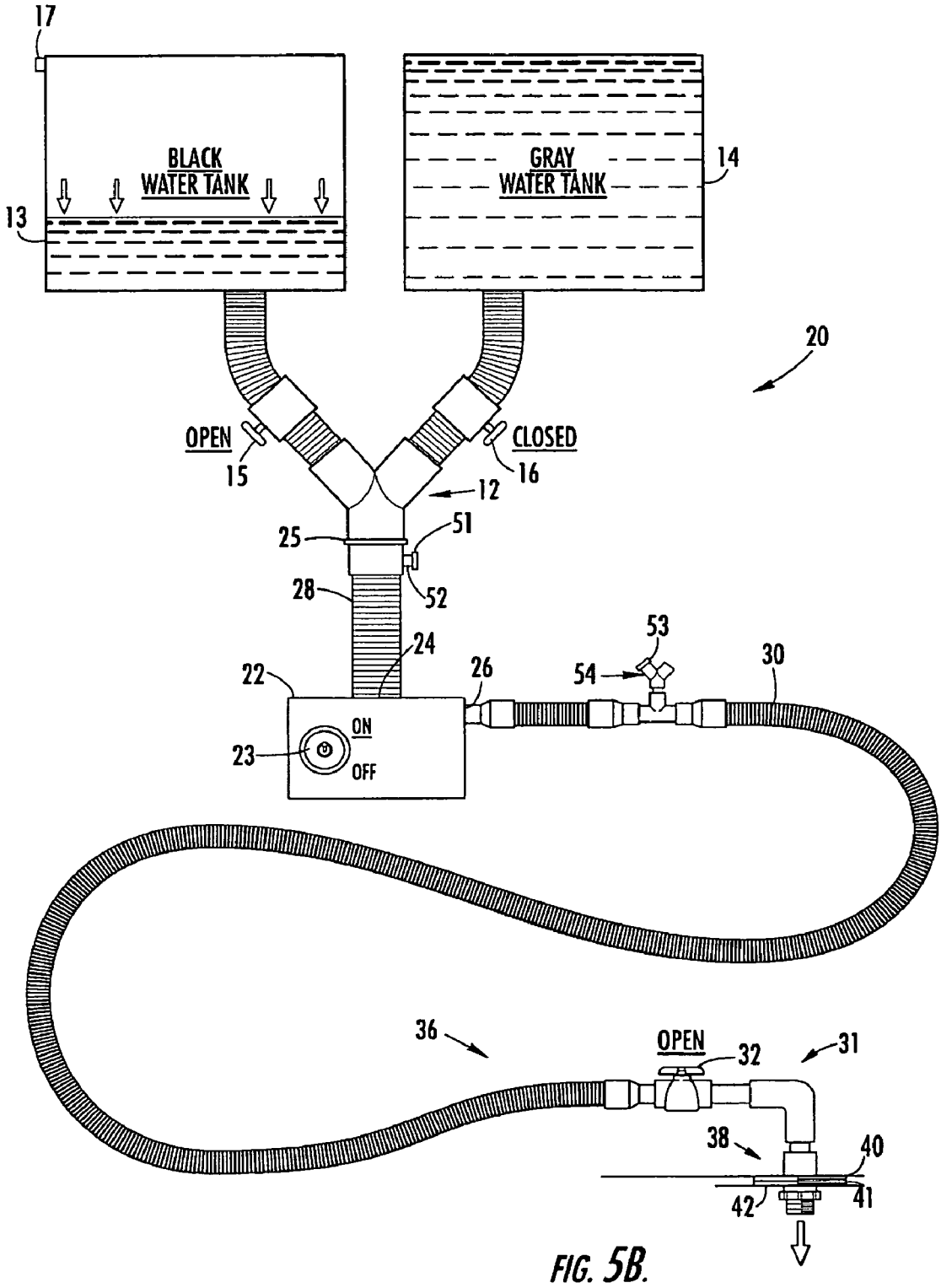
Figure 5C:
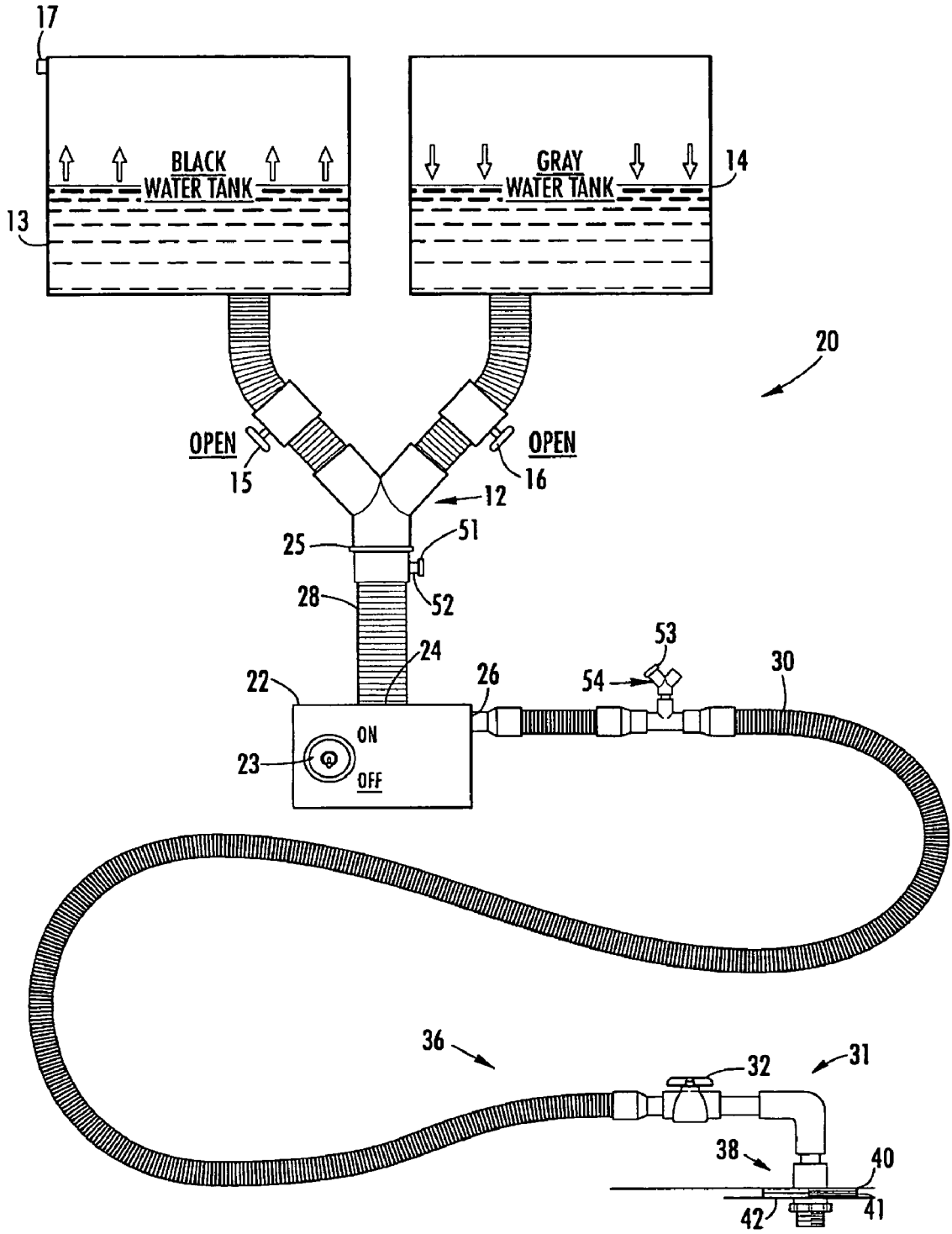

FIGS. 5A-5E illustrate yet another embodiment of the present invention, wherein gray water from the gray water tank 14 can be directed to the black water tank 13 due to a pressure differential between the gray water tank and the black water tank. In this regard, wastewater from the gray water tank 14 is introduced into the black water tank 13 that advantageously contains detergents and surfactants. The gray water therefore acts to flush the black water tank 13 so that solid matter and other waste can be easily removed. According to this embodiment, the drainage hose 30 is attached to the dump station 18 as described above, and the black water tank 13 is initially drained so that the volume of black water in the black water tank is less than the volume of gray water in the gray water tank (FIGS. 5A-5B). After turning the pump 22 off so that wastewater is prevented from passing therethrough, the gray water tank valve 16 is opened while leaving the black water tank valve 15 open such that the gray water tank 14 and black water tank 13 are in fluid communication with the pump via the discharge pipe 12 (FIG. 5C).

Figure 5D:
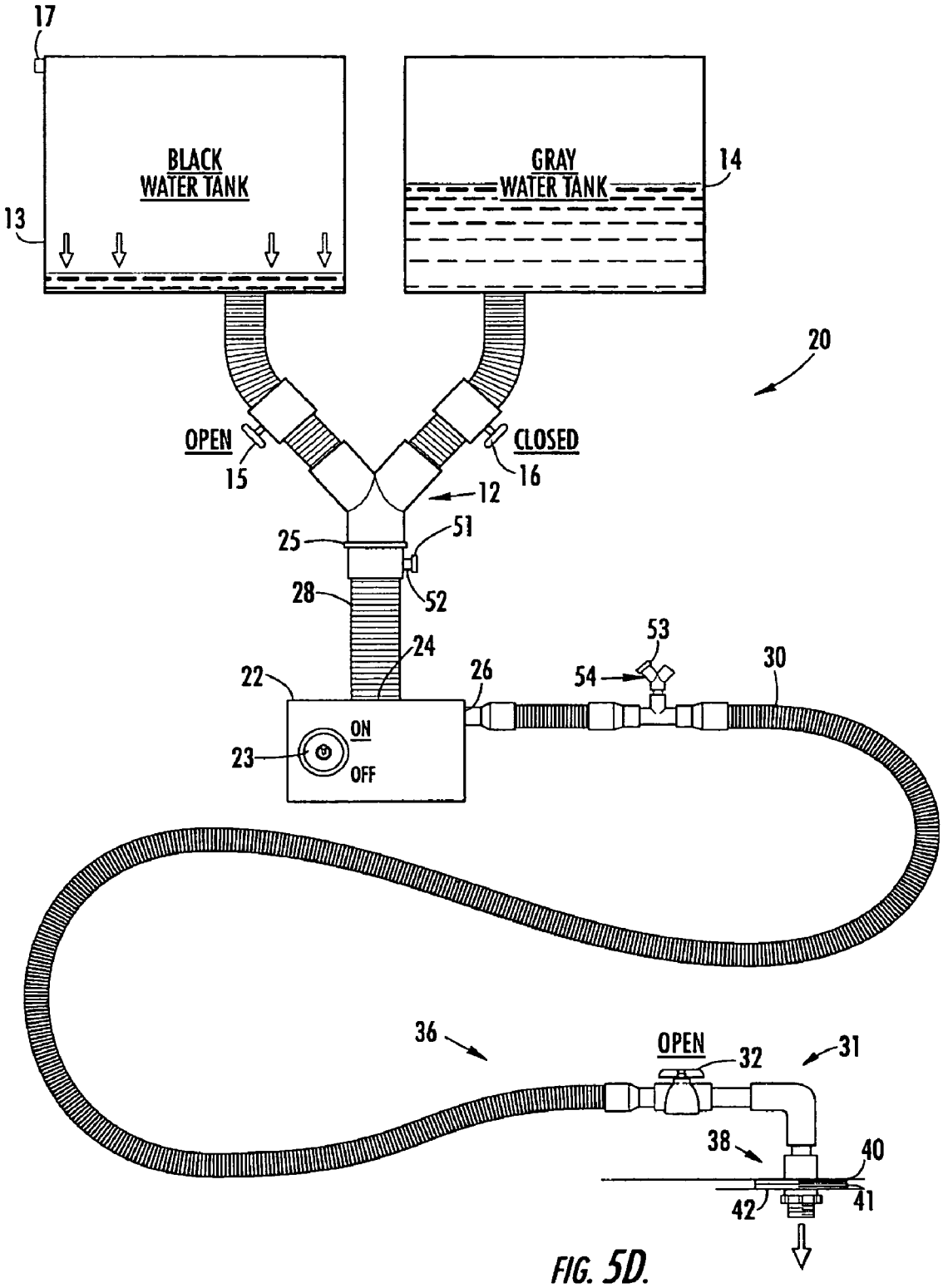
Figure 5E:
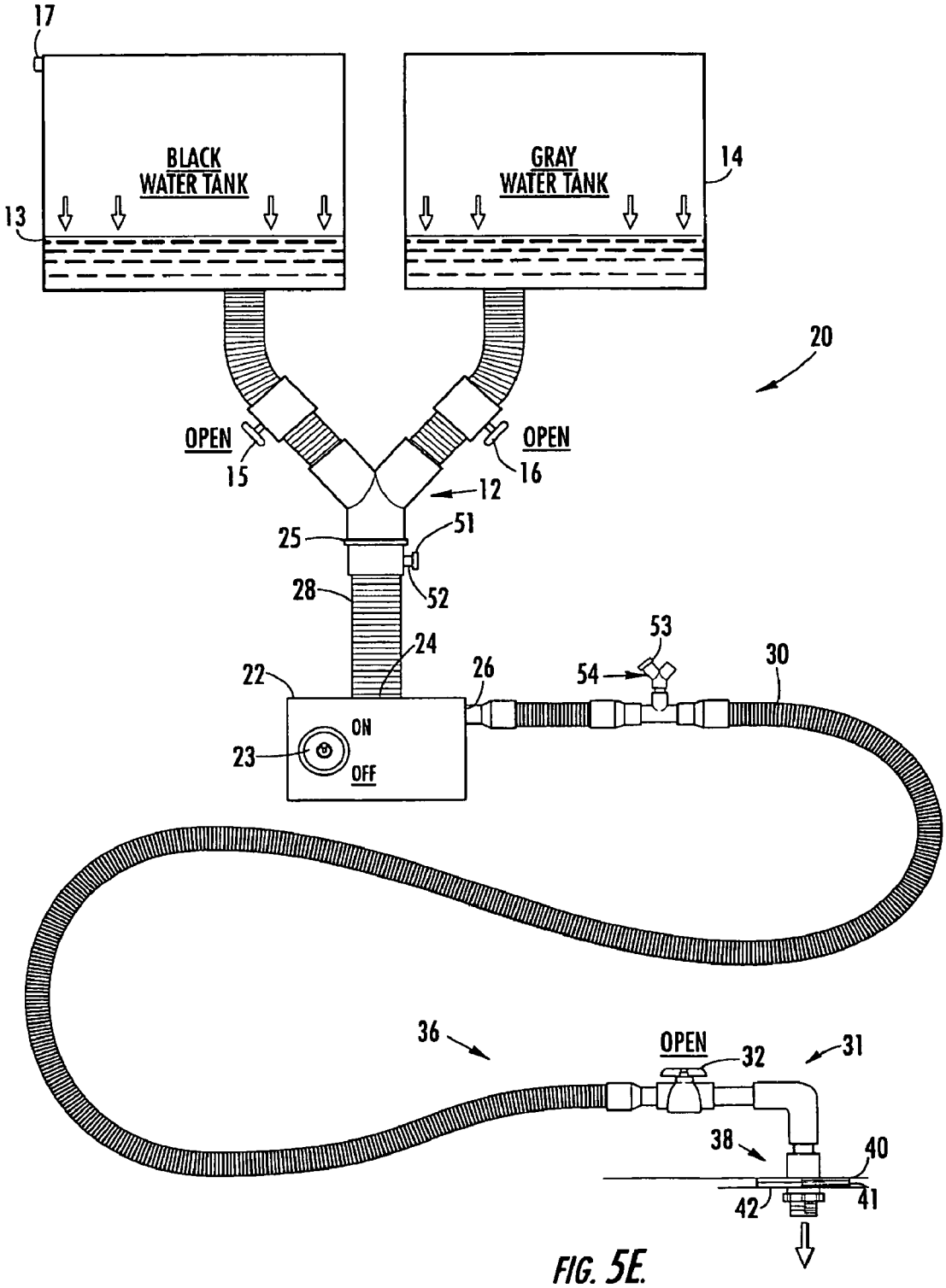

Accordingly, gray water flows into the black water tank 13 due to the volume and thus pressure differential between the gray water tank 14 and the black water tank. Once the gray water tank 14 and the black water tank 13 have equal volumes of wastewater, the gray water tank valve 16 is closed and the pump 22 is turned on so that the black water tank can be drained again (FIG. 5D). Alternatively, the gray water tank valve 16 can be left open when draining the black water tank 13 (FIG. 5E). Advantageously, the gray water from the gray water tank 14 dilutes the concentration of the black water in the black water tank 13, which loosens the solid matter and allows the black water tank to be easily drained. Furthermore, no fresh water is required during the process, which saves fresh water storage and eliminates the need for the RV user to manually flush the toilet in the RV to introduce fresh water to the black water tank. In addition, the steps can be repeated as long as there is volume in the gray water tank 14.

Figure 6A:
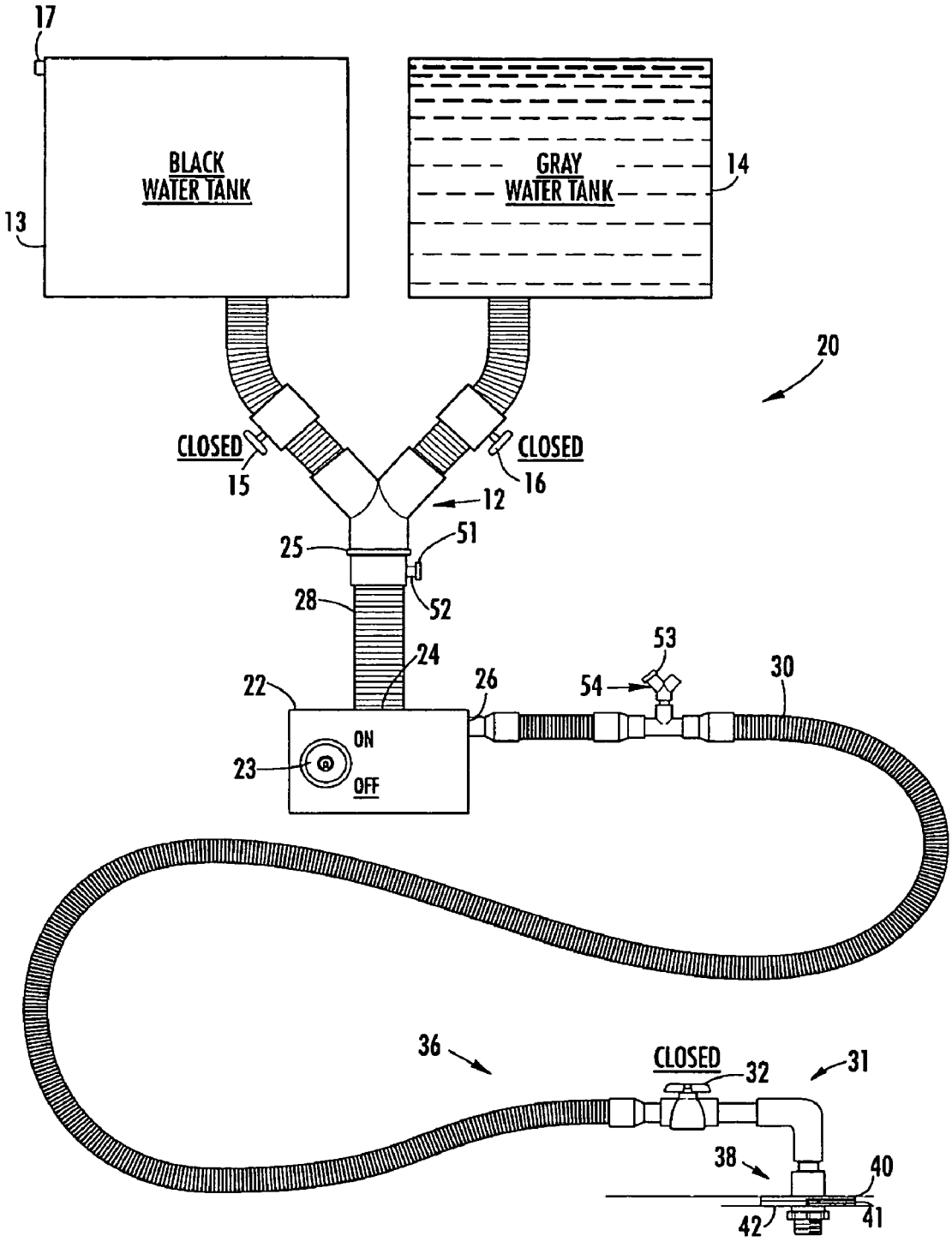
Figure 6B:
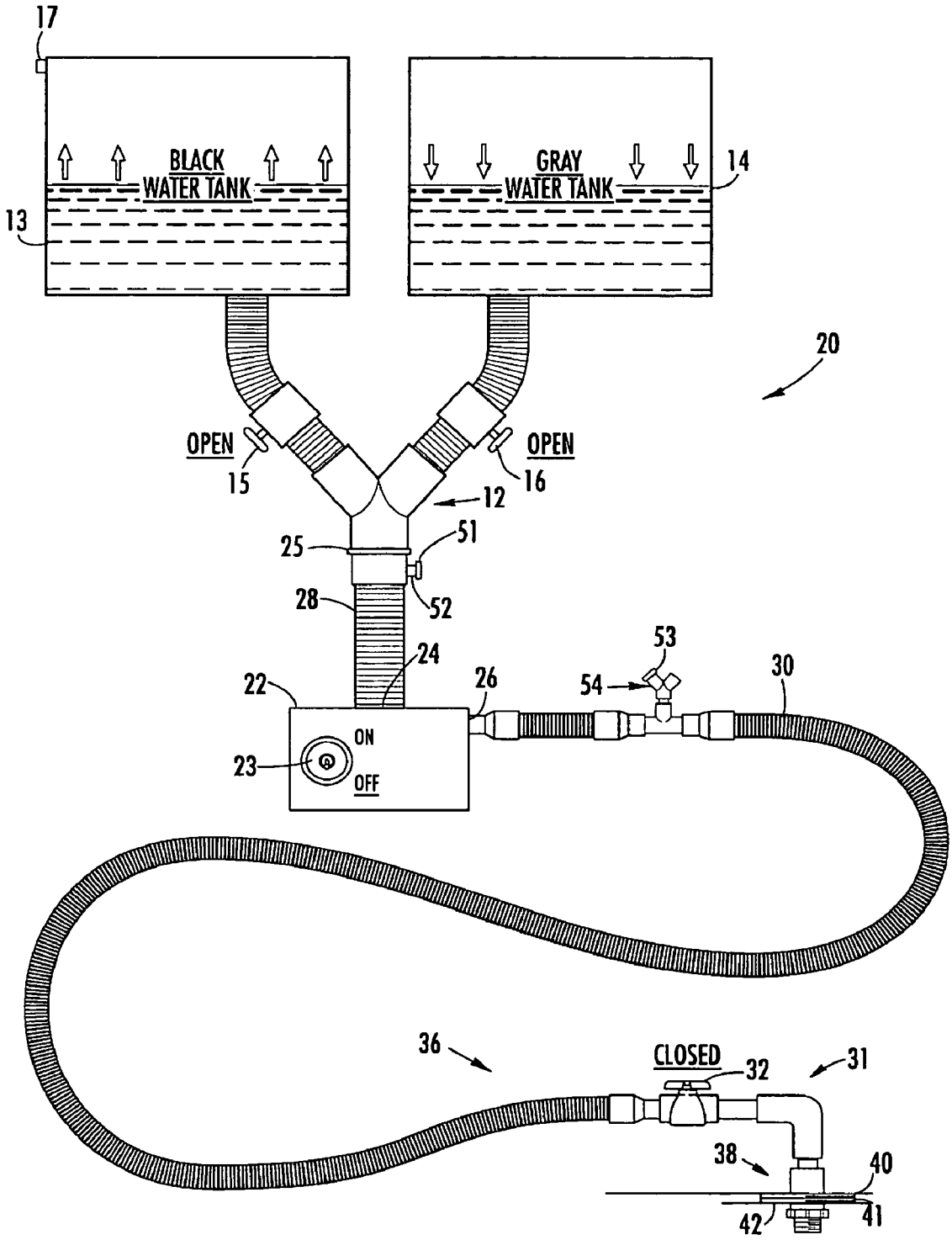
Figure 6C:
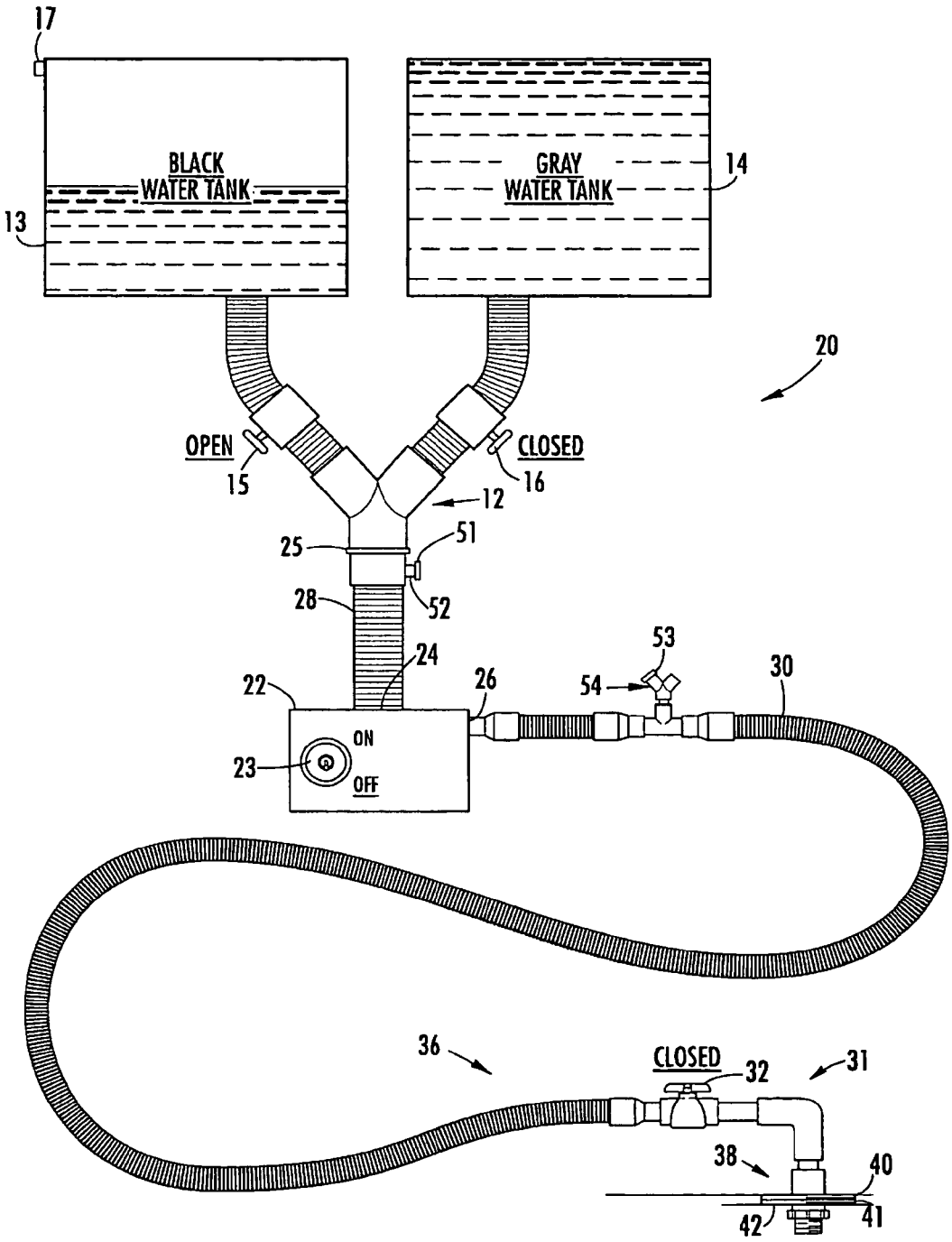
Figure 6D:
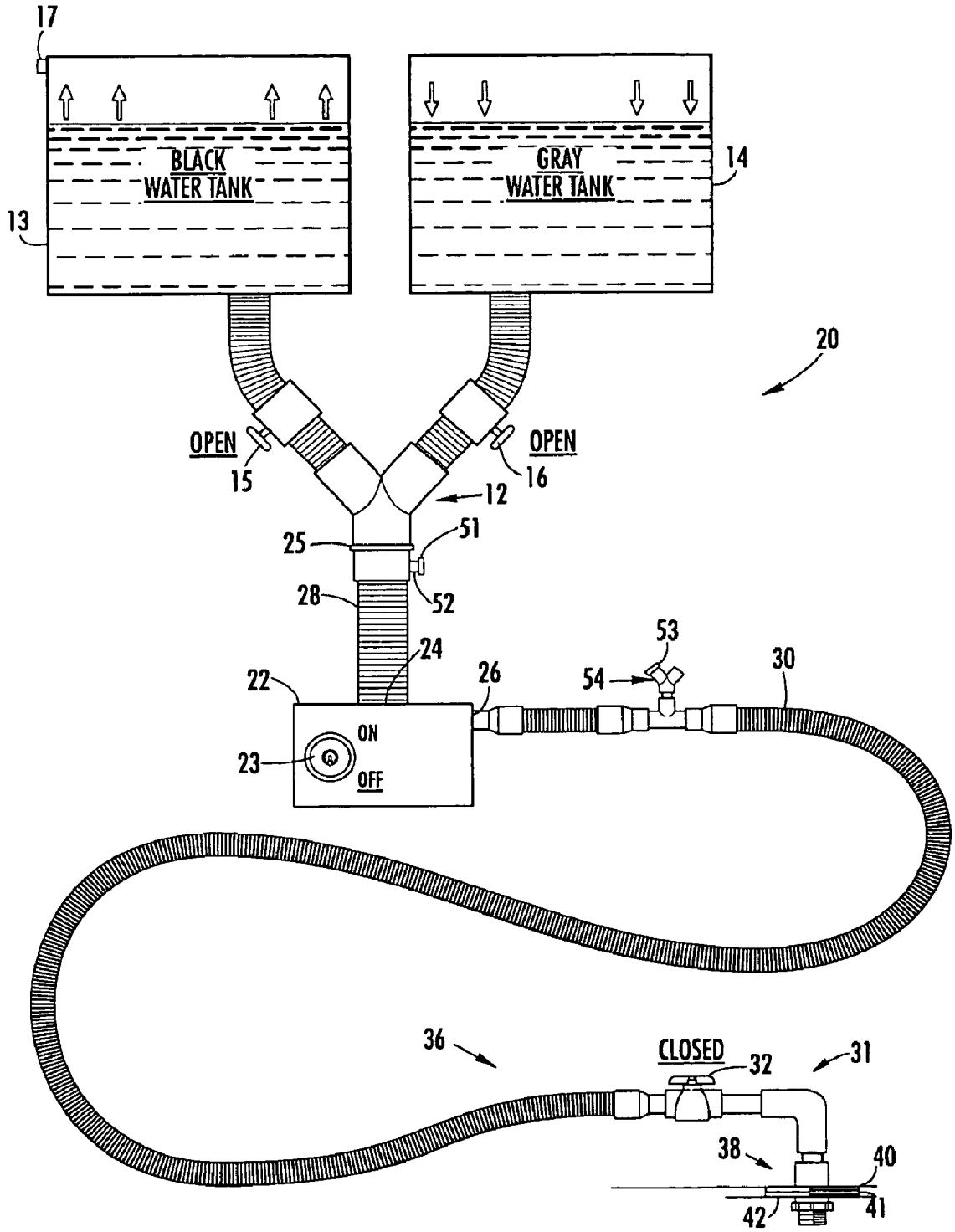
Figure 6E:
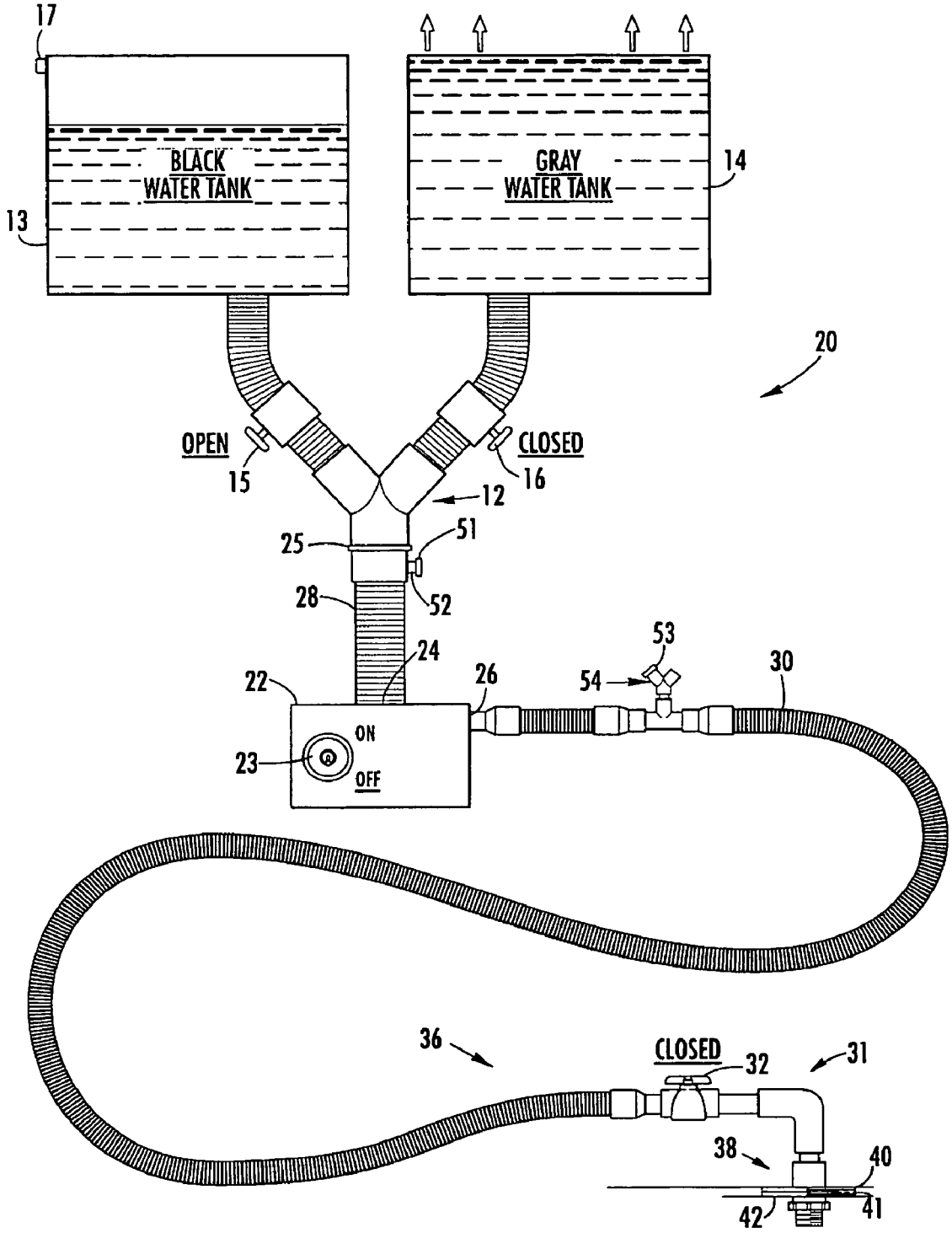
Figure 6F:
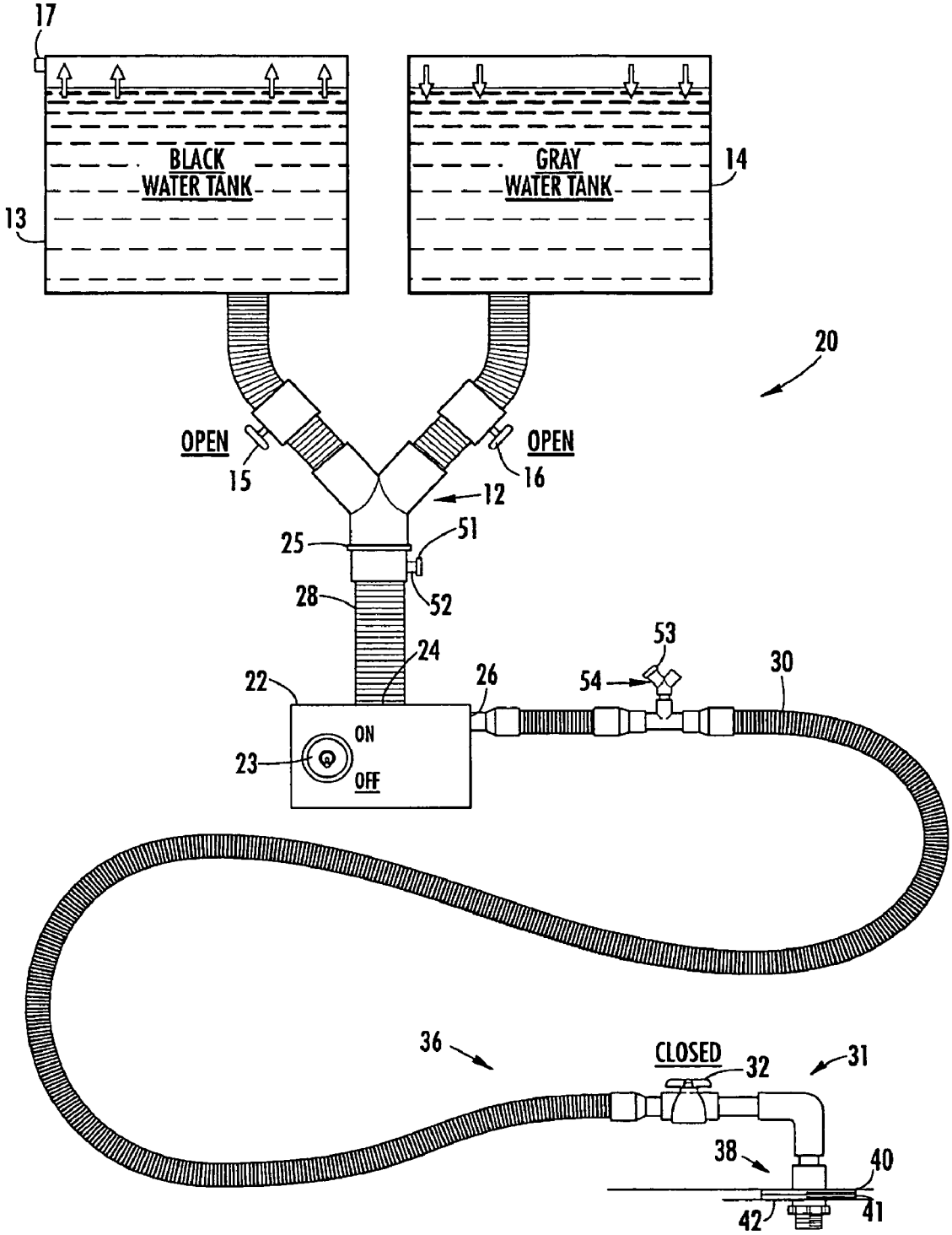

FIGS. 6A-6F illustrate yet another embodiment of the present invention, wherein the disposal system 20 is used to store gray water in the black water storage tank 13, which can effectively double the gray water storage of the vehicle, such as the RV 10. Thus, the RV user can stay on the road for several additional days before requiring the tanks to be emptied. According to this embodiment, the initial water level in the black water tank 13 must be less than the initial water level in the gray water tank 14 (FIG. 6A), which typically occurs during normal usage since gray water is created at a higher rate than black water. At a desired interval, such as when the gray water tank 14 becomes fill, the gray water is directed from the gray water tank 14 to the black water tank 13 by opening the black water tank valve 15 and gray water tank valve 16 while the pump 22 is turned off (FIG. 6B). Advantageously, the greater pressure in the gray water tank 14 prevents any black water from flowing into the gray water tank. After the water levels and the black water tank and gray water tank have equalized, the gray water tank valve 16 is closed so that the gray water tank can be filled again and the process repeated (FIGS. 6C-6F). Thus, using 45 gallon storage tanks, this method of the present invention effectively provides up to 90 gallons of gray water storage.

Advantageously, the disposal method of the present invention eliminates the need to remove the drainage hose 30 and rinse the inside of the hose using a fresh water source as in conventional systems. By contrast, the disposal system 20 requires no external cleaning source. In addition, the system 20 can be easily stored in a sanitary fashion in the storage area 11 of the RV 10 when the discharge or disposal operation is completed. In this regard, when the discharge operation is complete the valve 32 is turned to the "OFF" position and the exit end 36 of the discharge device 31 is removed from the dump station 18, such as by unthreading the dump station adapter 38 from the dump station. The drip cap 34 can then be attached to the exit end 36 and the drainage hose 30 placed within the storage area 11. Unlike conventional systems, the disposal system 20 can be permanently attached to the discharge pipe 12, thus preventing unnecessary contact with wastewater and making the next disposal process quick and easy.

Accordingly, the system and methods of the present invention provide a sanitary, convenient, and environmentally beneficial system for disposing of wastewater from a recreational vehicle. Advantageously, the present invention allows gray water to flow into the black water tank due to a pressure differential therebetween for assisting and flushing the black water tank and preventing clogging thereof. Furthermore, the black water tank can be used as storage for gray water to increase the overall storage of the gray water and decrease the frequency of emptying the tanks of the RV.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

[1. A wastewater disposal system for a vehicle, comprising:

an inlet hose for directing a flow of wastewater from a discharge pipe of the vehicle;

a pump having an inlet and an outlet, the inlet of the pump being attached to the inlet hose and in fluid communication therewith;

an outlet hose connected to the outlet of the pump at one end and having an exit at the other end; and a discharge device attached to the exit of the outlet hose, wherein the discharge device includes a removable drip cap.]

2. A wastewater disposal system for a vehicle, comprising:

*a black water tank;*

*a gray water tank;*

[an inlet hose for directing a flow of wastewater from a discharge pipe of the vehicle] *a discharge pipe in selective fluid communication with the black water tank and the gray water tank*;

a pump having an inlet and an outlet, the inlet of the pump being attached to the [inlet hose] *discharge pipe* and in fluid communication therewith; [and]

an outlet hose connected to [the outlet of] the pump at one end and having an exit at the other end[, further comprising]*; and* a bypass hose releasably connected to the [inlet hose] *discharge pipe* and to the outlet hose*, the bypass hose coupled to the discharge pipe and the outlet hose for selective fluid communication therebetween.*

3. A wastewater disposal system for a vehicle *according to claim 2*, [comprising:

an inlet hose for directing a flow of wastewater from a discharge pipe of the vehicle;

a pump having an inlet and an outlet, the inlet of the pump being attached to the inlet hose and in fluid communication therewith; and an outlet hose connected to the outlet of the pump at one end and having an exit at the other end,] wherein the bypass hose includes a valve positioned at each end thereof for selecting a desired flow rate through the bypass hose.

4. A wastewater disposal system for a vehicle, comprising;

*a black water tank;*

*a gray water tank;*

[an inlet hose for directing a flow of wastewater from a discharge pipe of the vehicle] *a discharge pipe in selective fluid communication with the black water tank and the gray water tank*;

a pump having an inlet and an outlet, the inlet of the pump being attached to the [inlet hose] *discharge pipe* and in fluid communication therewith;

an outlet hose connected to [the outlet of] the pump at one end and having an exit at the other end; and a flush hose connected to the outlet hose and [a wastewater storage tank of the vehicle] *to the black water tank for selective fluid communication therebetween* for directing wastewater from the outlet hose to the [wastewater storage] *black water* tank.

[5. A wastewater disposal system for a vehicle, comprising:

at least one wastewater storage tank inside the vehicle;

a discharge pipe connected to the at least one wastewater storage tank;

an inlet hose connected to the discharge pipe for directing a flow of wastewater from the at least one wastewater storage tank;

a pump having an inlet and an outlet, the inlet of the pump being permanently attached to the inlet hose and in fluid communication therewith;

an outlet hose connected to the outlet of the pump at one end and having an exit at the other end; and a discharge device connected to the exit of the outlet hose, the discharge device being operable to selectively prevent the flow of wastewater therethrough, said pump operable to pump wastewater directly from the wastewater storage tank in the vehicle to a fixed dump station.]

6. A method of disposing wastewater from a vehicle having a black water tank and a gray water tank in selective fluid communication therewith [via a hose], the gray water tank having an initial gray water level greater than zero, the method comprising:

draining the black water tank [through the hose] to a level below the initial water level in the gray water tank;

draining the gray water tank such that at least a portion of the gray water flows into the black water tank due to a pressure differential between the gray water tank and the black water tank; and emptying at least a portion of the gray water and the black water from the black water tank [through the hose] to flush the black water tank.

7. A method according to claim 6, wherein the black water tank draining step includes directing the black water tank through a pump.

8. A method according to claim 6, wherein the emptying step includes closing the gray water tank before emptying the black water tank.

9. A method according to claim 6, wherein the emptying step includes emptying at least a portion *of the* gray water from the gray water tank.

10. A method according to claim 6, wherein the steps are repeated until the gray water tank is empty.

11. A method of storing wastewater in a vehicle having a gray water tank and black water tank in *selective* fluid communication therewith via a [hose] *discharge pipe connected to a pump*, the gray water tank having an initial water level greater than zero, the method comprising:

*turning off the pump;* providing an initial water level in the black water tank less than the initial water level in the gray water tank; [and]

*adding wastewater to the gray water tank such that the gray water tank has a water level greater than the black water tank;*

*directing a second flow of wastewater from the gray water tank to the black water tank until the gray water tank and the black water tank have substantially equal water levels; and* directing a flow of wastewater from the gray water tank to the black water tank until the gray water tank and the black water tank have substantially equal water levels.

[12. A method according to claim 11, further comprising:

adding wastewater to the gray water tank such that the gray water tank has a water level greater than the black water tank; and directing a second flow of wastewater from the gray water tank to the black water tank until the gray water tank and the black water tank have substantially equal water levels.]

[13. A method of disposing wastewater into a fixed dump station from a vehicle having a black water tank and a gray water tank, the method consisting of:

directing black water from the black water tank through a pump and a drainage hose; and directing gray water from the gray water tank through the pump and the drainage hose, wherein the pump and drainage hose are cleaned by the gray water and the wastewater is passed directly into the fixed dump station.]

[14. A method according to claim 13, wherein the black water and gray water are directed through a macerator pump.]

[15. A method according to claim 13, further comprising directing the black water and the gray water out of the drainage hose through a valve operable to prevent flow therethrough.]

16. A method according to claim [15] *18*, further comprising preventing flow from the gray water tank after directing the wastewater through the pump and flush hose to the black water tank.

17. A method according to claim [15] *18*, further comprising preventing flow through the flush hose before directing wastewater from the black water tank.

18. A method of disposing wastewater from a vehicle having a black water tank and a gray water tank, comprising:

attaching a flush hose from the black water tank to an intermediate location along a drainage hose that is connected to a pump, the drainage hose having an exit end;

directing wastewater from the gray water tank through the pump and flush hose to the black water tank; and directing wastewater from the black water tank through the pump and out the exit end of the drainage hose.

[19. A wastewater disposal system for a vehicle, comprising:

an inlet hose for directing a flow of wastewater from a discharge pipe of the vehicle;

a pump having an inlet and an outlet, the inlet of the pump being permanently attached to the inlet hose and in fluid communication therewith; and an outlet hose connected to the outlet of the pump at one end and having an exit at the other end.]

[20. A wastewater disposal system according to claim 19, further comprising a discharge device attached to the exit of the outlet hose.]

[21. A wastewater disposal system according to claim 20, wherein the discharge device comprises a valve for selecting a desired flow rate therethrough.]

[22. A wastewater disposal system according to claim 20, wherein the discharge device includes a removable drip cap.]

[23. A wastewater disposal system according to claim 19, wherein the discharge device includes an adapter for releasably securing the discharge device to a wastewater storage area.]

[24. A wastewater disposal system according to claim 23, wherein the adapter is capable of preventing the release of gases from the discharge device to the atmosphere.]

[25. A wastewater disposal system according to claim 19, further comprising a bypass hose releasably connected to the inlet hose and to the outlet hose.]

[26. A wastewater disposal system according to claim 25, wherein the bypass hose includes a valve positioned at each end thereof for selecting a desired flow rate through the bypass hose.]

[27. A wastewater disposal system according to claim 19, further comprising a flush hose connected to the outlet hose and a wastewater storage tank of the vehicle for directing wastewater from the outlet hose to the wastewater storage tank.]

[28. A wastewater disposal system according to claim 19, wherein the pump is a macerator pump.]

[29. A wastewater disposal system according to claim 19, wherein the pump prevents the flow of wastewater through the pump unless the pump is turned on.]

[30. A wastewater disposal system according to claim 19, further comprising a power switch for selectively engaging the pump.]

31. A wastewater disposal system according to claim [19] *2*, wherein the inlet [hose] is permanently attached to the discharge pipe of the vehicle.

32. A wastewater disposal system for a vehicle, comprising:

an inlet hose for directing a flow of wastewater from a discharge pipe of the vehicle;

a pump having an inlet and an outlet, the inlet of the pump being attached to the inlet hose and in fluid communication therewith;

an outlet hose connected to the outlet of the pump at one end and having an exit at the other end; and a discharge device attached to the exit of the outlet hose, said discharge device including an adapter for releasably securing the discharge device to an opening defined by a wastewater storage area, said opening having a diameter greater than that of said outlet hose*;*

*wherein the discharge device comprises a valve for selecting a desired flow rate therethrough.*

[33. A wastewater disposal system according to claim 32, wherein the discharge device comprises a valve for selecting a desired flow rate therethrough.]

34. A wastewater disposal system according to claim 32, wherein the adapter is capable of preventing the release of gases from the discharge device to the atmosphere.

35. A wastewater disposal system according to claim 32, wherein the pump is a macerator pump.

[36. A wastewater disposal system according to claim 32, wherein the inlet hose is permanently attached to the discharge pipe of the vehicle.]

*37. A wastewater disposal system according to claim 2, wherein the system includes an inlet hose that communicates between the discharge pipe and the pump.*

*38. A wastewater disposal system for a vehicle, comprising:*

*an inlet hose for directing a flow of wastewater from a discharge pipe of the vehicle;*

*a pump having an inlet and an outlet, the inlet of the pump being attached to the inlet hose and in fluid communication therewith;*

*an outlet hose connected to the outlet of the pump at one end and having an exit at the other end; and*

*a discharge device attached to the exit of the outlet hose, said discharge device including an adapter for releasable securing the discharge device to an opening defined by a wastewater storage area, said opening having a diameter greater than that of said outlet hose;*

*wherein the adapter is capable of preventing the release of gases from the discharge device to the atmosphere.*

*39. A wastewater disposal system for a vehicle, comprising:*

*an inlet hose for directing a flow of wastewater from a discharge pipe of the vehicle;*

*a pump having an inlet and an outlet, the inlet of the pump being attached to the inlet hose and in fluid communication therewith;*

*an outlet hose connected to the outlet of the pump at one end and having an exit at the other end; and*

*a discharge device attached to the exit of the outlet hose, said discharge device including an adapter for releasably securing the discharge device to an opening defined by a wastewater storage area, said opening having a diameter greater than that of said outlet hose;*

*wherein the pump is a macerator pump.*

* * * * *